United States Patent [19]
Hart et al.

[11] Patent Number: 5,665,895
[45] Date of Patent: Sep. 9, 1997

[54] APPARATUS AND METHOD FOR CALIBRATING A STORAGE TANK

[75] Inventors: Robert P. Hart, East Hampton, Conn.; Leonid M. Malinin, Cambridge, Mass.

[73] Assignee: Veeder-Root Company, Simsbury, Conn.

[21] Appl. No.: 587,885

[22] Filed: Jan. 11, 1996

Related U.S. Application Data

[63] Continuation-in-part of Ser. No. 459,122, Jun. 2, 1995, Pat. No. 5,544,518.

[51] Int. Cl.$^6$ ............................................. G01M 3/04
[52] U.S. Cl. ..................... 73/1.73; 73/49.2; 364/571.02
[58] Field of Search ........................ 73/1 H, 149, 49.2 T; 364/509, 571.02

[56] References Cited

U.S. PATENT DOCUMENTS

| | | |
|---|---|---|
| 3,841,146 | 10/1974 | Cross et al. . |
| 4,006,635 | 2/1977 | Khoi . |
| 4,186,591 | 2/1980 | Mooney . |
| 4,250,750 | 2/1981 | Martinec et al. . |
| 4,349,882 | 9/1982 | Asmundsson et al. . |
| 4,386,525 | 6/1983 | Mooney . |
| 4,445,627 | 5/1984 | Horak . |
| 4,528,839 | 7/1985 | Blanchard et al. . |
| 4,555,941 | 12/1985 | Fathauer et al. . |
| 4,571,987 | 2/1986 | Horner . |
| 4,589,077 | 5/1986 | Pope . |
| 4,590,575 | 5/1986 | Emplit . |
| 4,646,560 | 3/1987 | Maresca, Jr. et al. . |
| 4,649,739 | 3/1987 | Horner . |
| 4,672,842 | 6/1987 | Hasselmann . |
| 4,679,425 | 7/1987 | Bolland . |
| 4,716,536 | 12/1987 | Blanchard . |
| 4,732,035 | 3/1988 | Lagergren et al. . |
| 4,736,329 | 4/1988 | Ferretti et al. . |
| 4,748,846 | 6/1988 | Haynes . |
| 4,788,648 | 11/1988 | Ferretti et al. . |
| 4,796,469 | 1/1989 | Brown et al. . |
| 4,807,464 | 2/1989 | Janotta . |
| 4,811,601 | 3/1989 | Tolan . |
| 4,819,483 | 4/1989 | Emplit et al. . |
| 4,827,762 | 5/1989 | Hasselmann . |
| 4,840,056 | 6/1989 | Fernandez et al. . |
| 4,847,794 | 7/1989 | Hrubes . |
| 4,850,223 | 7/1989 | Carlin et al. . |
| 4,852,054 | 7/1989 | Mastandrea . |
| 4,893,498 | 1/1990 | Jansen . |
| 4,896,282 | 1/1990 | Orwell . |
| 4,908,783 | 3/1990 | Maier . |

(List continued on next page.)

FOREIGN PATENT DOCUMENTS

| | | |
|---|---|---|
| 3326719 | 1/1984 | Germany . |
| 617008 | 12/1978 | Switzerland . |
| 2138947 | 10/1984 | United Kingdom . |

*Primary Examiner*—Robert Raevis

[57] ABSTRACT

An apparatus and method are provided for calibrating a liquid storage tank. The apparatus includes a sensor disposed within the tank for sensing the liquid levels in the tank and one or more metering devices for measuring the amount of liquid dispensed into or out of the tank. A processor is also provided which is capable of determining the volume in the tank as well as the amount of liquid dispensed into or out of the tank based on liquid level measurements obtained during idle periods following dispensing periods. The processor is programmed with an algorithm which employs a mathematical function which relates either the volume of the liquid or the change in volume of the liquid per unit of associated height change of the liquid in the tank as a function of the height of the liquid in the tank and a number of calibration parameters which include the length, diameter, end shape, and tilt of the tank as well as the offset of the sensor from the bottom of the tank. The calibration routine involves searching for the calibration parameters which minimize the sum of the square of the residuals between a first set of refined data values which are derived using the measured volumes (or volumes per unit of height change) dispensed by the meter devices and a second set of estimated volumes (or volumes per unit of height change) which are derived using the mathematical expression.

31 Claims, 27 Drawing Sheets

U.S. PATENT DOCUMENTS

| | | |
|---|---|---|
| 4,914,943 | 4/1990 | Lagergren . |
| 4,945,756 | 8/1990 | Lewis et al. . |
| 4,954,973 | 9/1990 | Jacob et al. . |
| 4,964,296 | 10/1990 | Jensen . |
| 4,972,710 | 11/1990 | Uhlarik et al. . |
| 4,977,528 | 12/1990 | Norris . |
| 4,986,113 | 1/1991 | Harrison et al. . |
| 5,035,141 | 7/1991 | Baird et al. . |
| 5,056,017 | 10/1991 | McGarvey . |
| 5,075,877 | 12/1991 | Jacob et al. . |
| 5,086,644 | 2/1992 | Schendel . |
| 5,088,317 | 2/1992 | Jensen . |
| 5,131,264 | 7/1992 | Jensen . |
| 5,263,371 | 11/1993 | Maresca, Jr. et al. . |
| 5,297,423 | 3/1994 | Keating et al. . |
| 5,309,760 | 5/1994 | Watanabe et al. . |
| 5,319,545 | 6/1994 | McGarvey et al. . |

APPARATUS AND METHOD FOR CALIBRATING A STORAGE TANK

CROSS REFERENCE TO RELATED APPLICATIONS

This application is a continuation-in-part of application Ser. No. 08/459,122 filed on Jun. 2, 1995, now U.S. Pat. No. 5,544,518.

FIELD OF THE INVENTION

The present invention relates generally to techniques for calibrating systems designed to determine the amount of material in a storage tank, and more particularly is directed to a technique of calibrating such a system which is accurate over the whole height range of the tank, i.e., from the top to the bottom of the tank.

BACKGROUND OF THE INVENTION

The purpose of tank calibration in general is to develop a tank chart for converting heights to volumes. The tank chart, also known as a tank strap chart, converts liquid level readings, in units of length (typically mm or inches), to volume, in units of volume (typically liters or gallons). Tank strap charts are used by gasoline service stations to determine the amount of fuel in a tank. They inform the operator when the tank needs refilling. They are also useful in reconciling dispensing meter amounts against tank readings for tracking tank system integrity or liquid inventory for business purposes. It is necessary that the tank chart be highly accurate for this purpose to minimize discrepancies. Tank strap charts have also found use in determining whether there is a leak in the tank and at what rate liquid is leaking into or out of the tank. This latter use of tank strap charts has taken on increasing importance recently as a result of heightened environmental concerns.

Tank strap charts are typically calibrated by comparing the volume or change in volume per unit of height change in the tank as measured by metering devices and liquid level sensor with estimated volumes or volume changes per unit of height change determined using the tank strap chart. Such techniques use metering devices which are typically integrated with tank dispensers to measure the amount of liquid dispensed into and out of the tank. These measurements are generally considered quite accurate because of the precision of the instruments used in taking these measurements. Liquid level sensors are also used to measure the height of the liquid in the tank. These devices are disposed within the tank, and are also considered quite accurate.

From the height measurements, the estimated volumes or changes in volume can be determined using the tank strap chart. By comparing the "true" volume changes to the estimated volume changes, errors between the data can be determined. These errors are in turn used to refine the tank strap chart. The steps of comparing the volume changes and refining the tank strap chart are repeated until the error between the "true" volume changes and the estimated volume changes is within an acceptable range. Once this is achieved the tank chart has been calibrated.

Known calibration techniques have several drawbacks. One of the problems is that since input data are only available over a limited height range, typically in the middle of the tank (which is where most of the dispensing activity occurs), the chart cannot be accurately extrapolated to the top and the bottom, which are the two regions where the greatest discrepancies often exist and accuracy is needed most. For instance, low level accuracy is needed to determine the amount needed to refill the tank. Low and high level accuracy is needed to verify the amount of a refill.

Another technique generates the tank strap chart from a theoretical model which is based on the dimensions of the tank. Such a technique is disclosed in U.S. Pat. No. 4,977,528. This techniques utilizes a microprocessor which is programmed to determine the dimensions of the tank by reducing errors between the actual volumetric amounts of liquid in the tank derived from the metering equipment and the amounts of liquid calculated based on the assumed dimensions of the tank. However, this technique does, not take into account such factors as the tilt of the tank relative to the gravity field and the position of the sensor in the tank. Both of these factors have an impact on the accuracy of the estimated values especially at the top and bottom of the tank. Furthermore, this technique fails to remove outliers, i.e., data points having a low signal-to-noise ratio, which may result from among other things measurement errors and waves in the tank.

Yet another drawback of available calibrating techniques is that none of them take into account the dynamic condition of the liquid in the tank when the instantaneous Opening and closing height readings are taken.

The present invention is directed at providing a solution to the above mentioned problems.

SUMMARY OF THE INVENTION

In one aspect of the present invention, an apparatus is provided for calibrating a liquid storage tank. The apparatus includes a sensor for sensing liquid levels in the tank and providing first output signals for receipt by a processor. The sensor may include a capacitance probe or a magnetostrictive probe or any other height or volume measurement technology. The apparatus further includes one or more metering devices connected to the tank which measure the amount of liquid dispensed into or out of the tank and provide second output signals for receipt by the processor. Third output signals originate from the dispensers and carry information on the beginnings and ends of the dispensing periods.

The processor receives all of the output signals and utilizes an algorithm employing a mathematical formula which automatically generates the tank chart for the entire range of possible fuel heights, not just over the height range of recent activity. While several mathematical functions (e.g., n-th order polynomials) are available to approximate this tank shape function, a shape related multi-parameter volume versus height formula for cylindrical tanks yields the smallest errors. This is particularly true when trying to predict the chart at the top and bottom of the tank by extrapolating from data collected at the center. The set of parameters, which needs to be known to convert heights into volumes with reasonable accuracy, is referred to further on as "calibration parameters." They may include, e.g., dimensions of the tank, probe offset and tilt. With respect to a cylindrical-shaped liquid storage tank with domed ends, the dimensions include the tank's length, diameter and end shape, the latter defined as the ratio of the dome's volume to the volume of a theoretical hemispherical end. Knowing diameter, length, probe offset, tilt, and end shape (or a subset of these parameters in some cases) allow accurate volumes to be calculated at any height.

If the calibrations parameters of the tank were known and there were no noise in the data, then the height drops would convert into (estimated) volume changes, exactly matching the measured volume changes. The next step in the calibration process is to find such a set of the calibration parameters which would provide the closest match (agreement) between the measured and the estimated volume changes. The calibration parameters, of course, must stay within some reasonable bounds. For example, the offset should not exceed a small fraction of the diameter. These bounds have to be taken into account when these parameters are being sought for. Since the volume changes are different at different tank heights, these data are accumulated over a range of fuel heights during normal tank activity. When adequate data are accumulated, a tank calibration may be performed by adjusting the existing tank chart, or creating a new tank chart. However, a tank calibration is often required after a lapse of a limited time interval when gathered data may cover only a fraction of the height range. The present invention provides an accurate tank calibration over the entire height of the tank even when only such limited data is available.

BRIEF DESCRIPTION OF THE DRAWINGS

The foregoing and other features of the present invention will be best appreciated, with reference to the detailed description of the invention, which follows when read in conjunction with the accompanying drawings, wherein:

FIGS. 16-18 show said relative errors due to errors in three different polarities of the end factor.

DETAILED DESCRIPTION OF THE INVENTION

Figure 1:
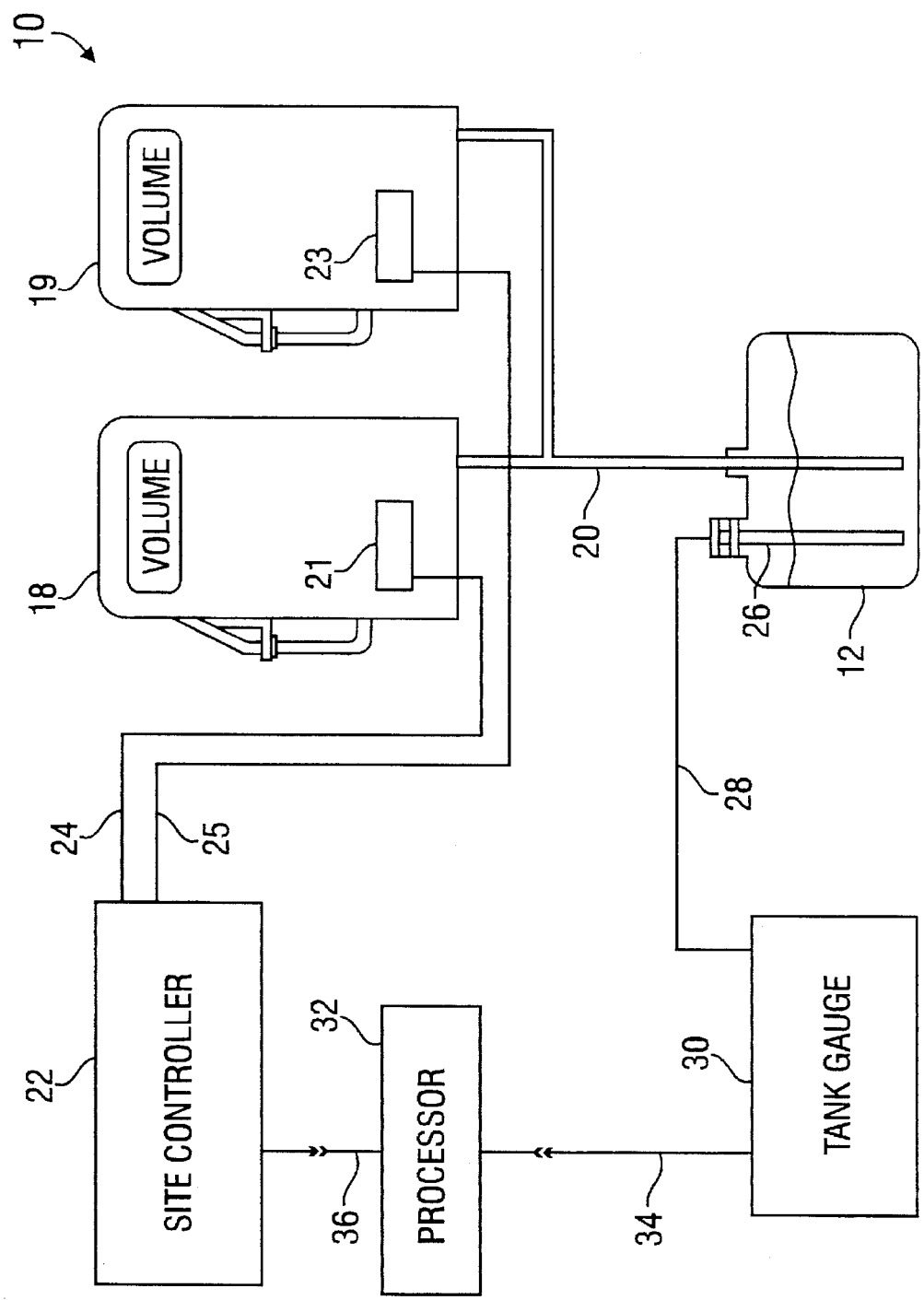
FIG. 1 is a schematic diagram of a fuel dispensing system embodying the present invention.

Turning now to the drawings and referring initially to FIG. 1, a fuel dispensing system is shown generally by reference numeral 10. The fuel dispensing system 10 includes a liquid storage tank 12 of a conventional construction. The storage tank 12 is typically cylindrically shaped and has flat, hemispherical, or ellipsoidal ends. It is formed of steel or a fiberglass reinforced plastic material.

One or more dispensers (shown are two) 18 and 19 are connected to the liquid storage tank 12 via a dispensing line 20. The dispensers 18 and 19 are of a conventional construction. They include a pump (either submersible in the tank or suction in the dispenser), valves (not shown) and metering devices 21 and 23 for metering the quantities of fuel dispensed. Several dispensers may be connected to a site controller 22. As one of ordinary skill in the art will recognize, the dispensers 18 and 19 can also be connected to other tanks. The site controller 22 is of conventional construction and includes means for displaying the volumes and costs of amounts dispensed by each dispenser and the total volume dispensed by every dispenser connected to the same tank or tanks. The latter means includes conventional circuitry for providing data, such as meter readings corresponding to the total volumes dispensed. This information is provided to the site controller 22 via communication lines 24 and 25 which are connected to the dispensers 18 and 19, respectively.

The present invention is directed to a tank calibration system. The system includes the metering devices 21 and 23 which are connected via the communication lines 24 and 25 to the site controller 22. It also includes a tank level sensor 26, of known construction, which is installed in the liquid storage tank 12. The tank level sensor 26 includes a transducer (e.g., a magneto-strictive or multiple capacitance probe) which provides electrical signals in response to changes in the level of the liquid within the storage tank 12. Examples of such tank level sensing devices are MAG1 and MAG2 Magnetostrictive Probes available from Veeder-Root, P.O. Box 2003, Simsbury, Conn., 06070, U.S.A.

The liquid level signals from the sensor 26 are communicated via a communication line 28 to a tank gauge 30. The liquid level signals from the level sensor 26 are then supplied to a processor 32 via communication line 34. The processor 32 also receives data signals from the site controller 22 via communication line 36 representing the "metering value" or total volumetric amount of fuel dispensed by the dispensers 18, 19 (and others) connected to the tank 12. The processor 32 may also include one or more A/D (analog to digital) converters as required, i.e., if the signal inputs are in analog rather than digital form. The tank gauge 30, which displays the amount of material in the storage tank 12, relays the liquid level signals from the sensor 26 to the computer 32 via the communication line 34. The tank gauge 30 may optionally be connected to a printer (not shown). The functions of the processor 32 may optionally be performed by the site controller 22 or tank gauge 30 in which case the communications described above are internal to the processor.

The processor 32 is programmed on the basis of the following two assumptions:

(a) The error in the volume displayed by totalizers in the site controller 22 is negligible (this must be achieved, in practice, to ensure that the correct cost is displayed for volume dispensed); and (b) The error in the liquid levels sensed by the liquid level sensor 26 is negligible.

These assumptions are valid, in practice, because:
(a) The metering devices 21 and 23 in the dispensers 18 and 19 are accurate to within typically plus or minus 0.3%, and it has very little short term drift; and
(b) While the liquid level/volume "sensing outputs" of the sensor 26 may not be correct, the repeatability of sensing/detection is excellent.

The meter readings communicated from the site controller 22 together with the liquid levels measured by the sensor 26 are used to derive calibration data for the tank 12. This data may be corrected as additional "metering values" and liquid levels are collected.

The processor 32 is programmed to generate sets of data used in calibrating the tank 12 as follows. First, liquid levels as detected by the sensor 26 in the tank 12 are collected before and after dispensing periods (opening and closing heights). From these liquid levels, the height drop corresponding to the dispensing period can be determined. To obtain reliable data, some restrictions need to be applied to the opening and closing heights. First, the height drop must exceed a minimum amount relative to the amount of estimated error or noise. Preferably the height drop should exceed 3 times the estimate of height drop error or noise for the dispensing period to be recorded. Second, the dispensing periods which are recorded should be preceded and succeeded by idle periods of such longevity that the opening and closing heights represent a settled condition of the liquid in the tank. In this case, waves on the surface of liquid resulting from the dispensing or other activity have vanished or can be adequately minimized by filtering or statistical means. To generate these "good quality" dispensing periods, the processor may merge, or coalesce, multiple raw busy periods into a single busy period that meets the above requirements.

However, dispensing periods which are too long can be a source of errors of another nature, so a certain trade-off is required in this process. The processor 32 keeps track of the length of the dispensing period by multiplying the number of data points by the known time interval between adjacent data points and assigns lower weight factors to the data points obtained from busy periods exceeding a certain threshold, e.g., one hour.

Figure 2:
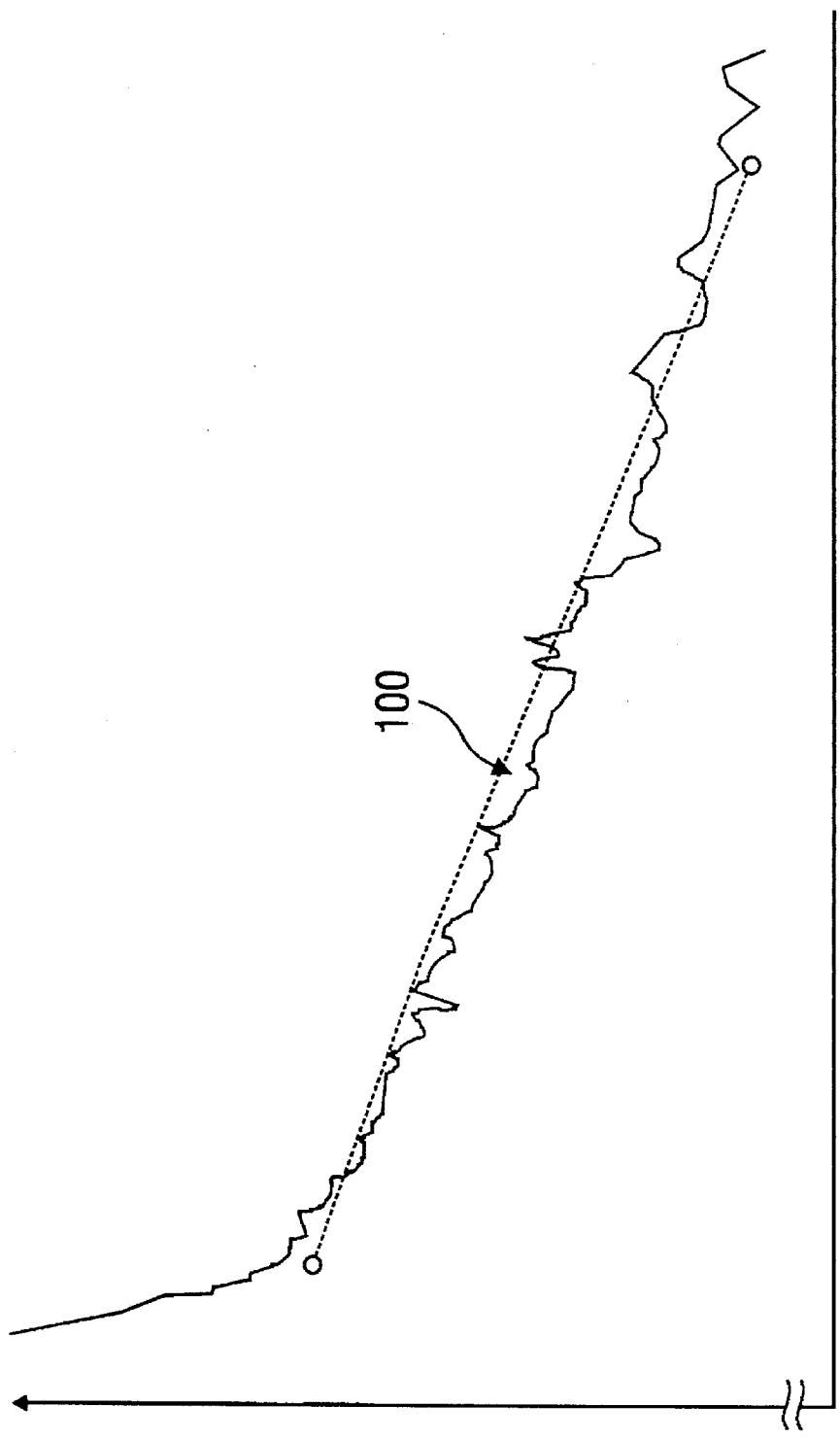
FIG. 2 is a graph showing how liquid height varies over time during an idle period.

FIG. 2 shows how a liquid height may vary over time during an idle period, due to, e.g., vapor loss and/or thermal contraction. An appropriate smooth function (e.g., a straight line or an exponential curve) illustrated by reference numeral 100 in FIG. 2 can be fitted to the idle height points using known curve fitting techniques. Since there are inevitable fluctuations of the liquid level in the tank during the idle periods, the values of the smooth function provide better estimates of the opening and closing heights than the instantaneous or "raw" opening and closing heights. The opening and closing heights are determined as the ordinates of the smooth function at the respective beginning and end of the busy periods. The beginning and end of the busy periods are determined by the processor 32 from the output signals received from the metering devices 21 and 23.

When a very short idle period occurs (i.e., when a small number of samples are taken) as measured by the processor 32, this procedure cannot be implemented. The instantaneous or "raw" opening and closing heights have to be used. In this situation, the first set of data points associated with these opening and closing heights are assigned a low weight factor, i.e., they are not weighed as heavily as data points associated with more reliable opening and closing heights.

Under very busy conditions, there may be only short idle periods (if any) between the consecutive busy periods. In this case, multiple raw busy periods have to be combined into a single busy period that has sufficient idle periods before and after the multiple busy periods to allow reliable derivation of the opening and closing heights. However, after some point, the usefulness of a busy period may actually decrease with duration. For that matter, if the length of the combined busy period exceeds some threshold (e.g., one hour) any short idle period has to be accepted, but the closing heights of the preceding busy period will be, again, assigned a low weight factor. On the other hand, if a long (combined) busy period is preceded and succeeded by long idle periods (e.g., a busy day between night time breaks), its opening and closing heights are assigned a high weight factor. These steps describe the preferred method of combining dispensing periods which have appropriate properties to allow accurate tank calibration.

Figure 3:
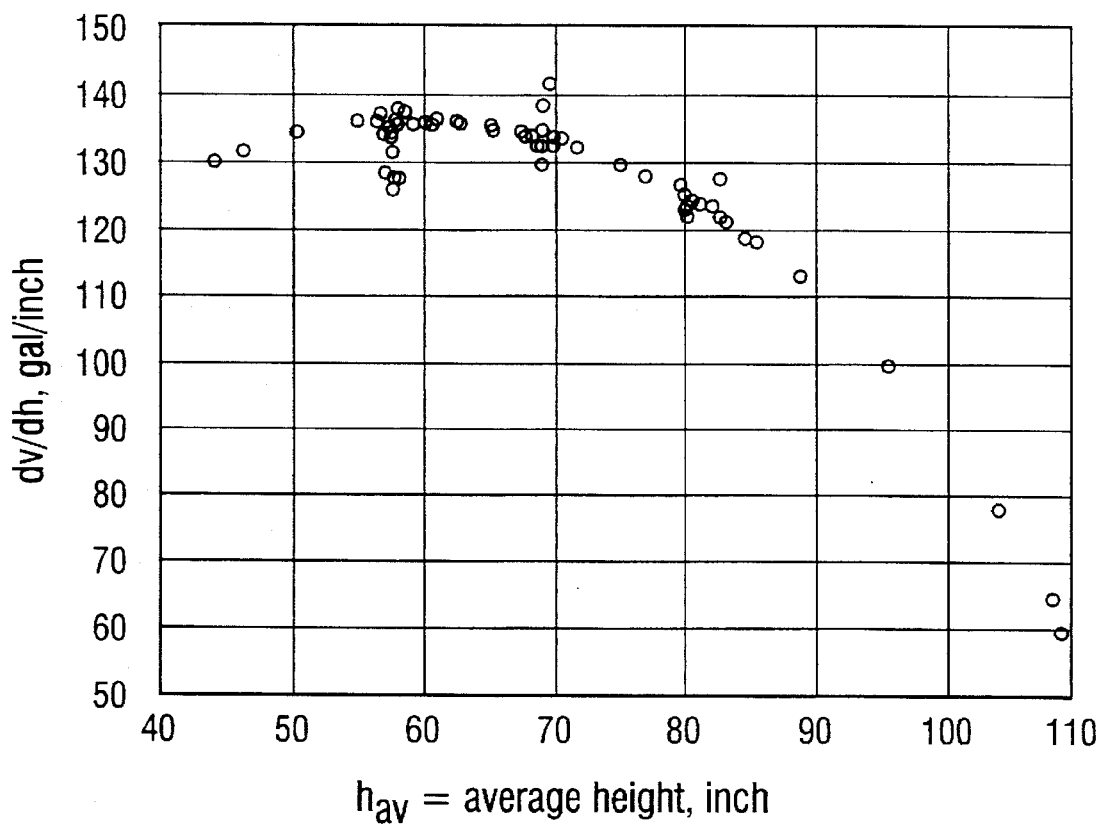
FIG. 3 is a graph of the dV/dh data points (differential volume per unit of differential height) as a function of average height.
Figure 4:
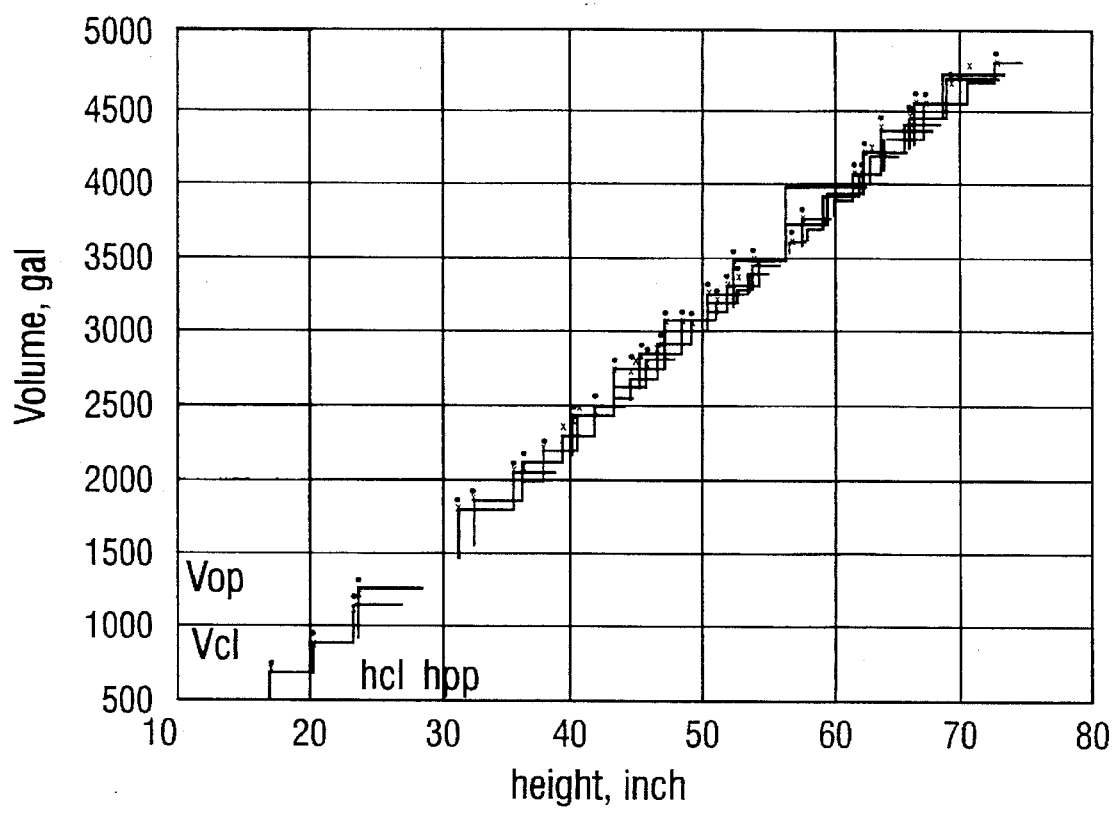
FIG. 4 is a graph of opening and closing volumes (Vop, Vcl), as a function of opening and closing heights (hop, hcl). Differential volumes Vop-Vcl are shown as vertical segments at closing heights.

After the opening and closing heights have been determined in the processor 32, they are used to construct the first set of data points, which may be the differential amounts of liquid alone (or per unit of differential height) as measured by the metering devices 21 and 23 at a plurality of heights in the tank 12 measured by the sensor 26 taken at a plurality of dispensing periods. The differential amounts of liquid per unit of differential height, dV/dh, i.e., (Vop-Vcl)/(hop-hcl) (the first set of data points) are plotted versus average heights on the graph shown in FIG. 3. The average height $h_{av}=(hop+hcl)/2$. The differential amounts of liquid alone (volumes) at a given height V vs. h is plotted on the graph shown in FIG. 4. In FIG. 4, the opening volumes Vop vs. opening heights hop and estimated closing volumes Vcl vs. closing heights Vcl are shown for each individual transaction. In this case, the first set of data are the differences Vop-Vcl. The processor 32 stores either of these values as the first set of data. The choice of which values to use is not critical to the ultimate calibration routine.

In the next step, the processor 32 calculates estimates of the differential amounts of liquid dispensed into or out of the tank alone (or per unit of differential height change). These estimates are calculated as a function of the height of the liquid in the tank 12. There is some difference between estimates of dV/dh and dV. Since every busy period generates just one dV/dh point, the estimate $dV/dh_{est}$ of this point has to be associated with a single height (not a couple of opening and closing heights). For this reason, it is customary to use the average height $h_{av}$. This issue does not arise when fitting differential amounts of liquid dV=Vop−Vcl, since in this case opening and closing volumes Vop and Vcl can be estimated separately and compared with the measured differential amount dV.

The processor 32 calculates the estimates of the differential amounts of liquid based on various calibration parameters of the tank which are applicable over the whole height range, from the bottom to the top of the tank. Unless this is done, the calibration results may only be operative over a region of the tank over which the height readings were gathered. To make the calibration results operative over the whole tank range, a mathematical expression, relating liquid volume in the tank to the measured liquid level, has to be derived for a specific geometrical model of the tank, taking also into account any correction which needs to be applied to the probe reading (e.g., offset), as well as other factors, affecting volume under the given height (e.g., tilt of the tank). An example of such an expression is given in Appendix A.

The second set of data is also stored by the processor 32. The second set of data has the same number of points as the first set. That is, if a point was removed from the first set, the associated point of the second set (with the same value of height and an estimated value of dV/dh or Vop/Vcl) would not be generated.

Figure 5:
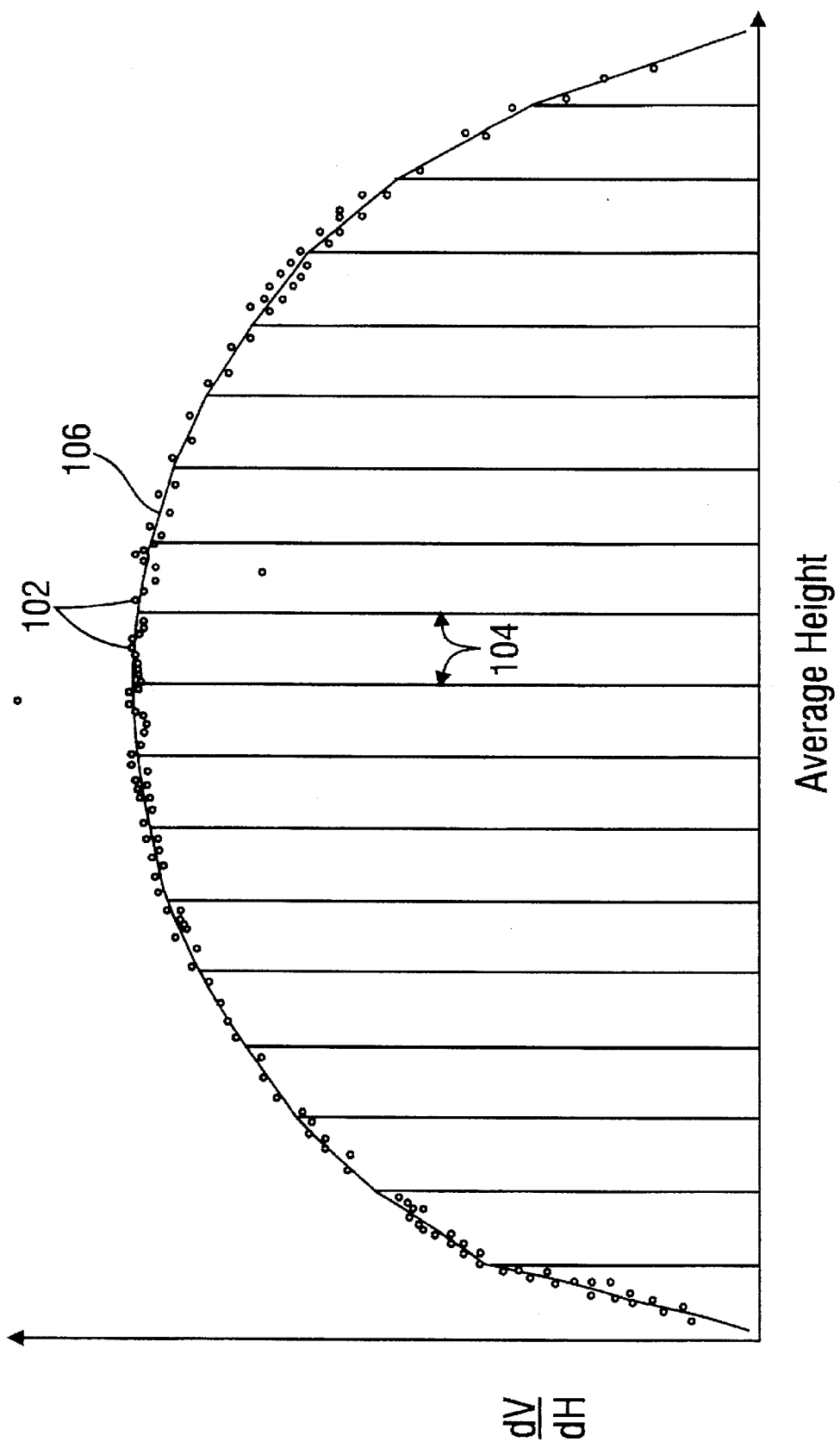
FIG. 5 is a graph of the first data set which has been collapsed into a limited number of segments, or slices, taken along the tank height.

Implementation of the present invention in an embedded system may result in a lack of processor memory required to manipulate the first and second sets of data. To solve this problem, the processor 32 is programmed to collapse the data points 102 from the first set of data into a limited amount of segments (or slices) 104 taken along the tank height, as shown in FIG. 5. This reduces the amount of data stored without sacrificing the accuracy of the results. Within every slice, the data points can be fitted by a smooth curve (e.g., a straight line) 106 and then the ordinate of this curve in the center of the slice, together with the associated height, is used in the subsequent calibration process rather than all the raw data points contained within the slice.

Figure 5A:
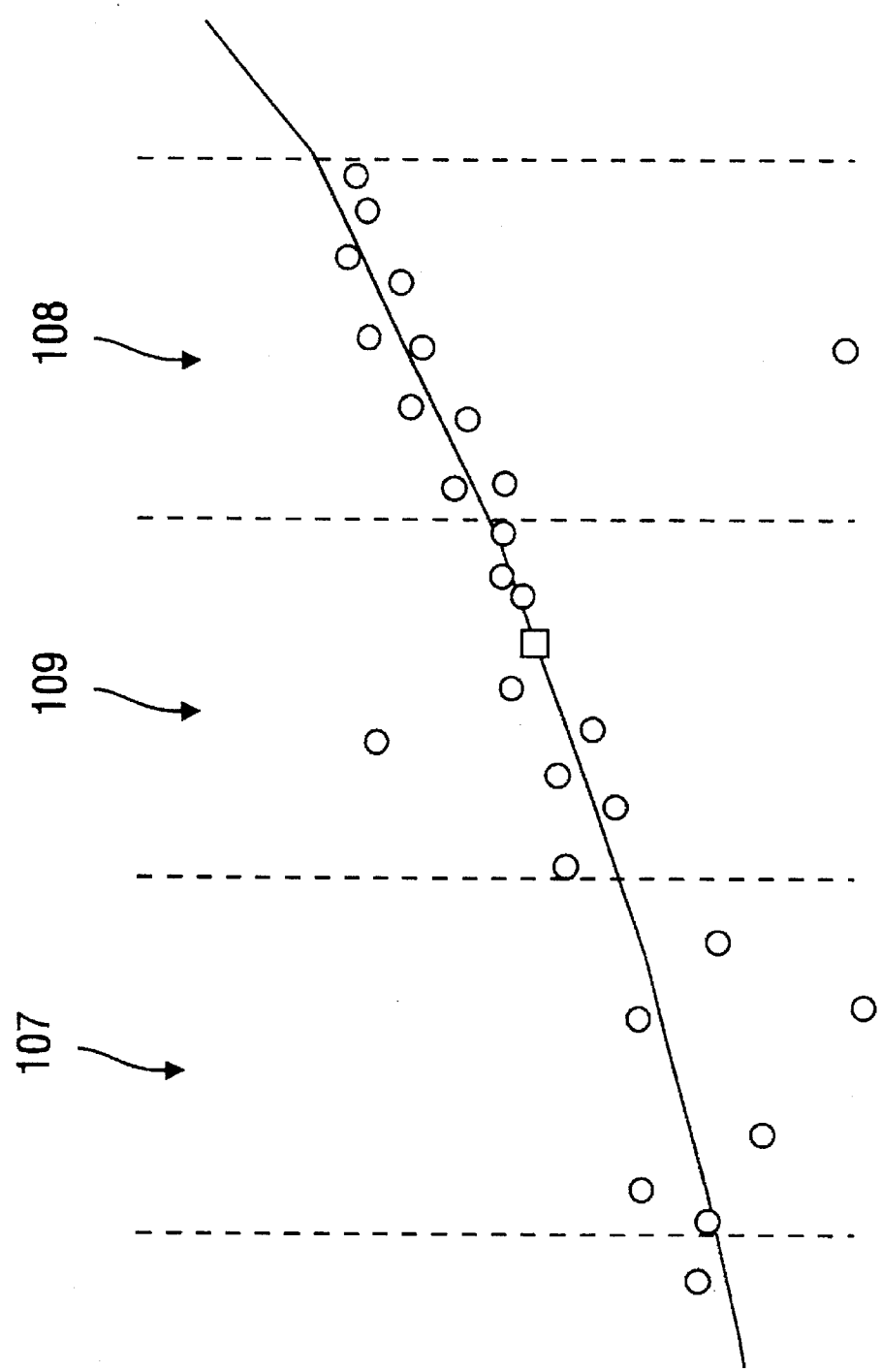
FIG. 5A is an enlarged graph of the first set of data points in three adjacent slices, fitted by straight lines within each slice, taken from the graph in FIG. 5.

More elaborated techniques can be developed by those skilled in the art to accommodate the data from the adjacent left and right slices 107 and 108, when the number of points in the primary slice 109 is low (see FIG. 5A). Other techniques, e.g., spline approximation, are also applicable for this purpose. Under this approach, for every slice is associated several registers (typically, no more than ten), where the coefficients required for the curve fitting within the slice are stored. When a new point in a slice is acquired, these registers are updated, but the point itself does not need to be stored, so the amount of the memory allocated is limited by said registers.

Figure 6:
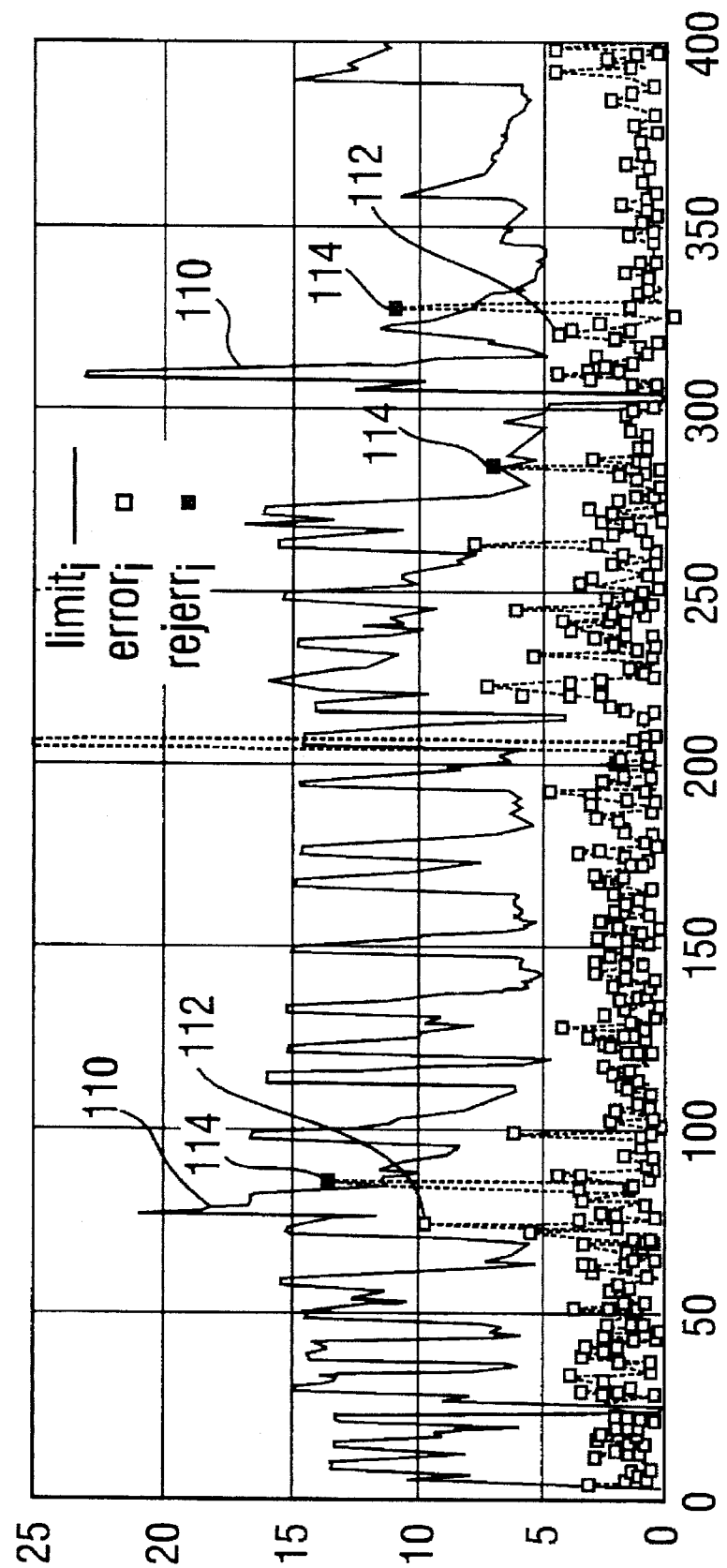
FIGS. 6-8 are graphs showing how the confidence bounds (rejection thresholds) and residual errors are applied to the decimation of the first data set.

To obtain reliable data before calibration, additional measures need to be taken to eliminate or minimize the effect of outliers in the first data set. One way to accomplish this is to filter and assign various weight factors to the incoming data. For example, for every slice, confidence bounds are introduced, such that any point outside of these bounds is rejected. Initially, when there are only a few (if any) points within a slice, these bounds are set relatively wide, e.g., 20 or 25 gallons per inch. As more points are accumulated within the slice, the bounds are narrowed. This process is illustrated by FIGS. 6–11. FIG. 6 shows the confidence bounds (rejection thresholds) 110 and residual errors 112 versus the data point (calibration record) number. As the height drops, a new slice is entered and the threshold exponentially decays from the initial value. The outliers outside of the confidence bounds are shown by reference numeral 114.

Figure 7:
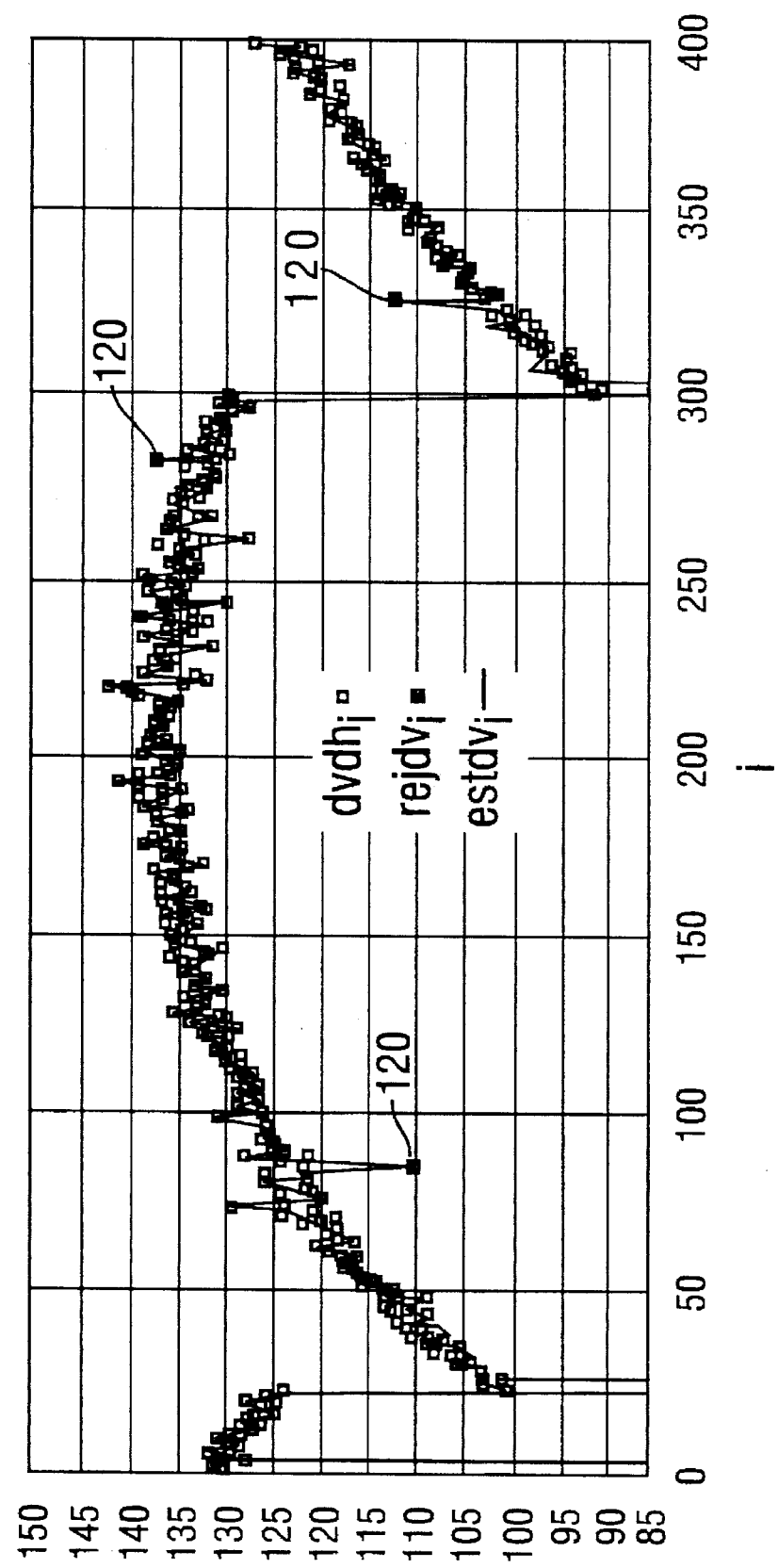

FIG. 7 plots the measured dV/dh versus data point number. The outliers are shown by reference numeral 120. Except for the few outliers shown, most of the measured dV/dh samples fall along a well behaved path indicative of the actual tank shape. The estimated dV/dh data values are plotted as a line curve roughly along the center of the non-outliers of the measured dV/dh boxes. This curve can be best be seen in FIG. 10.

Figure 8:
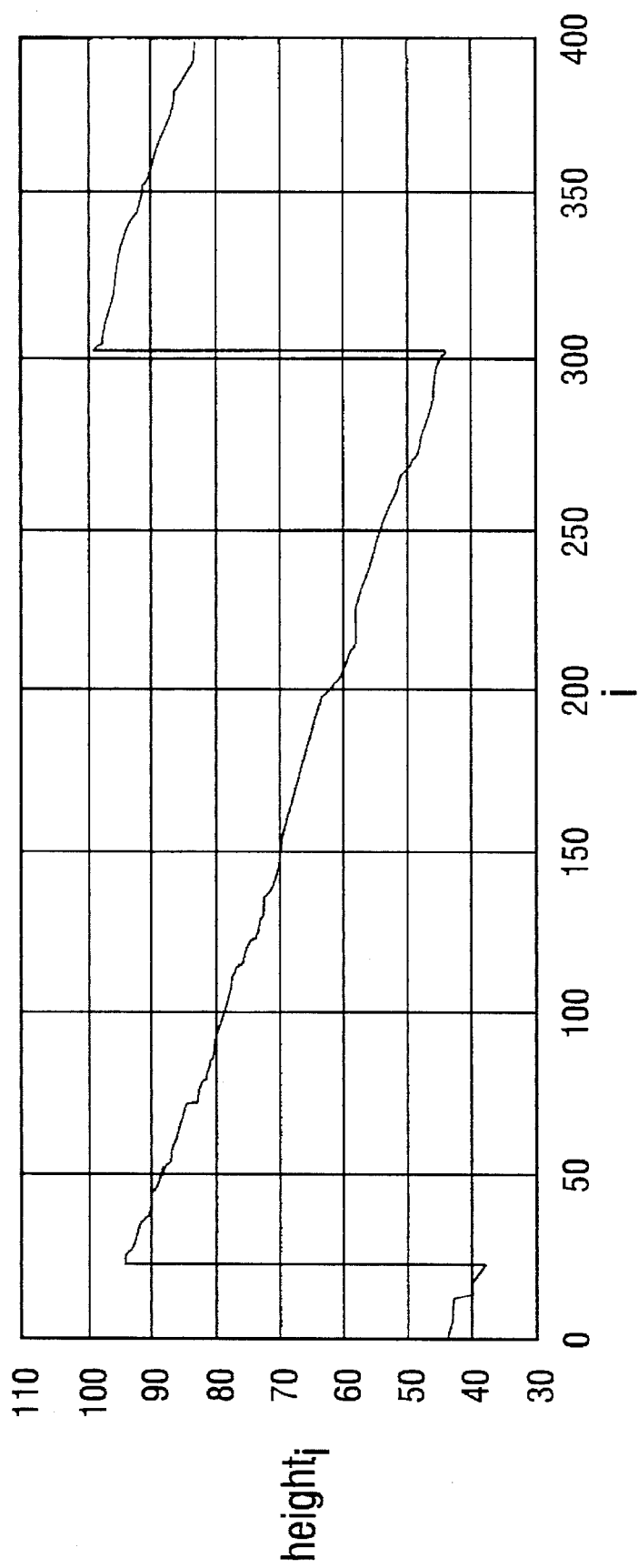

FIG. 8 plots fuel height versus calibration record. As can be seen, the height gradually decreases until reset by a delivery. The mid-height of the tank can be determined from the region on the dV/dh curve where dV/dh reaches a maximum (widest part of the tank). This occurs approximately at calibration record number 200.

Figure 9:
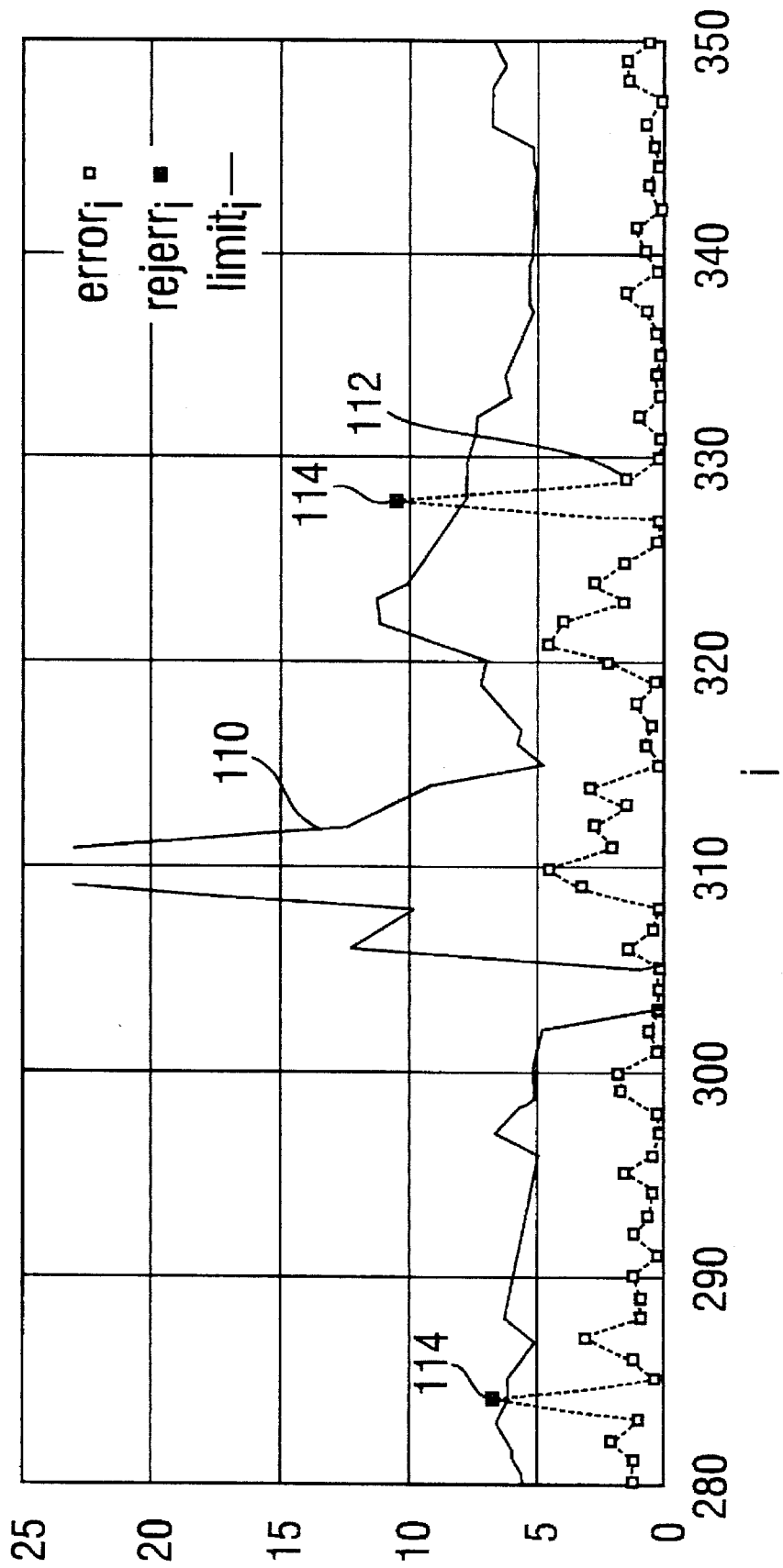
FIGS. 9-11 are graphs of a horizontally expanded subrange of the graphs shown in FIGS. 6-8.
Figure 10:
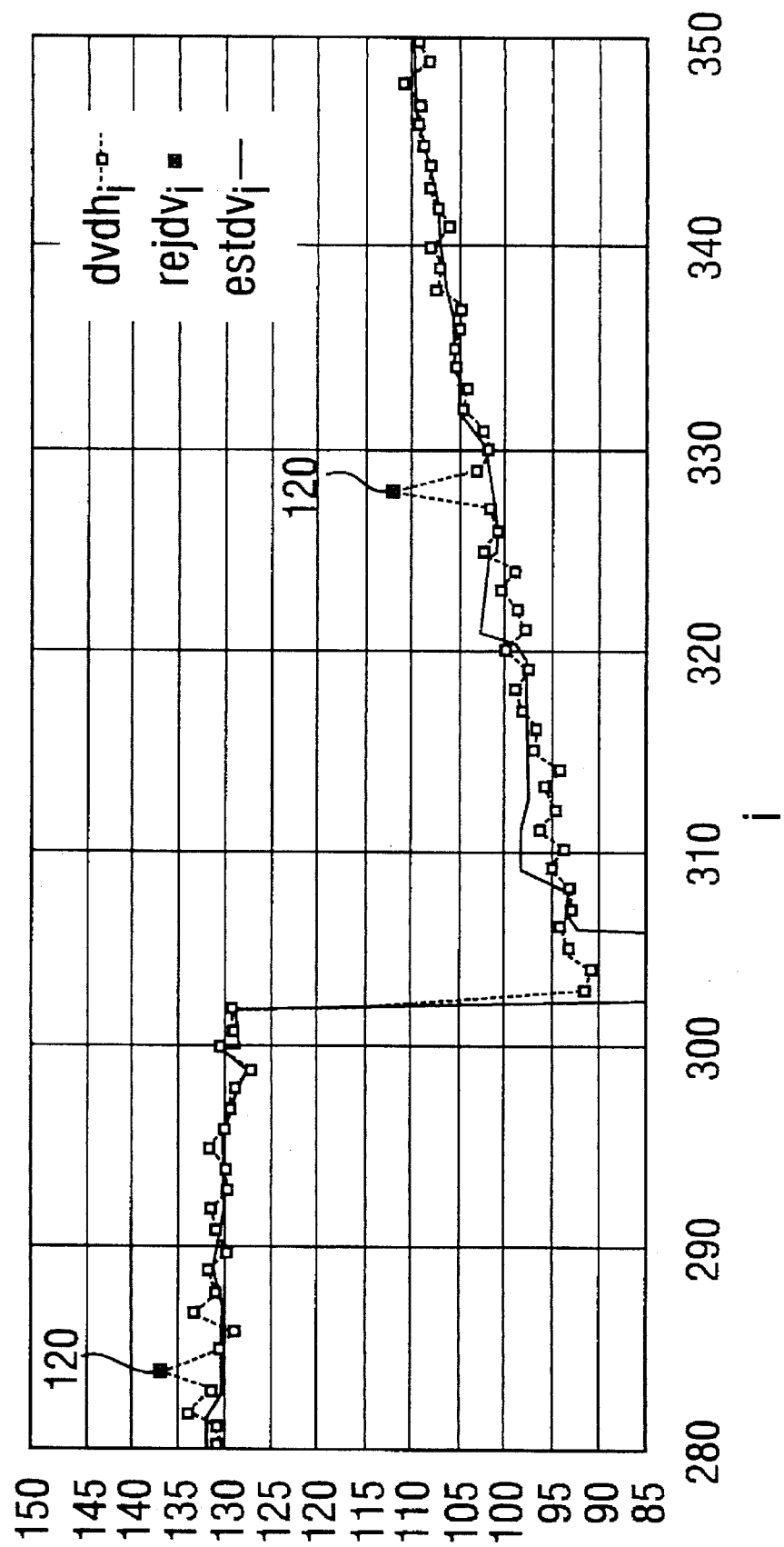
Figure 11:
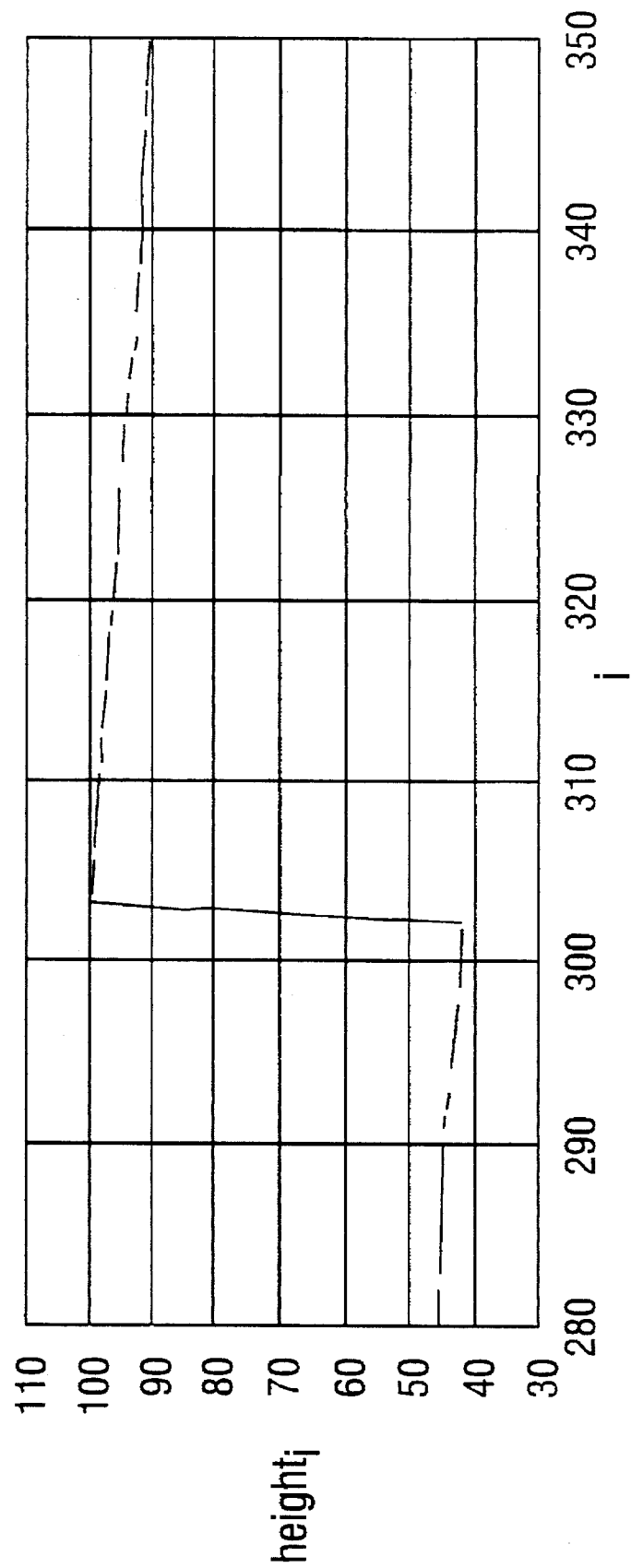

FIGS. 9–11 show a horizontally expanded sub-range of the graphs shown in FIGS. 6–8, respectively, in order to see detailed sample points more clearly. For example, the relationship between the measured dV/dh samples (boxes) and the rejection threshold (FIG. 9) and estimated true dV/dh (FIG. 10) is more apparent. The true dV/dh curve is used as the reference from which to estimate dV/dh residual errors.

Figure 12:
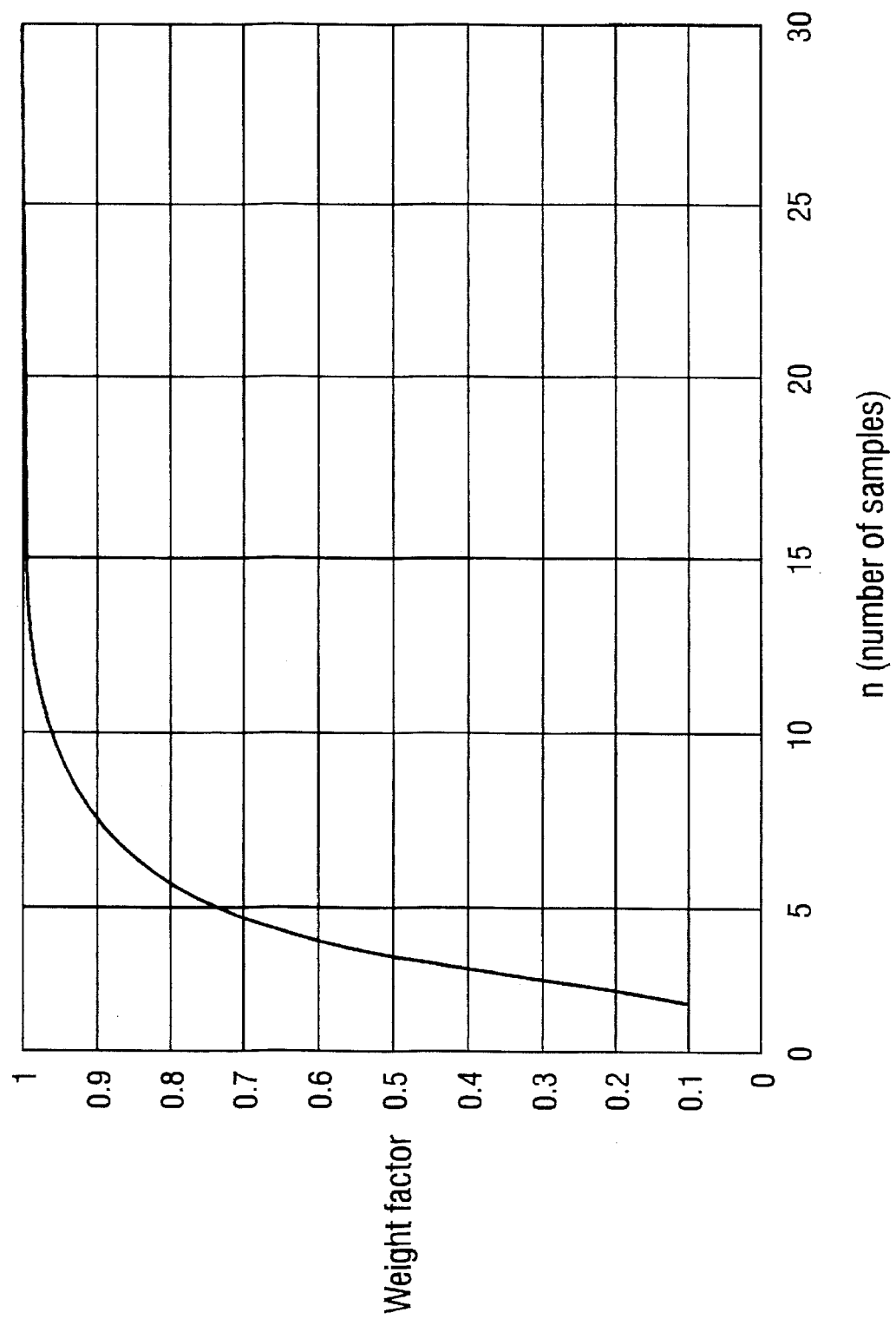
FIG. 12 is a graph of the weight factor as a function of the number of sample points.

When a new data point is acquired, it is matched against the confidence bounds which narrows as more points are gathered. Thus, as more points are acquired within a slice, acceptance of an outlier becomes less likely. Under this procedure, the earlier acquired points (acquired with wider bounds) are less reliable. To account for this, low weight factors are assigned to the earlier points. As lore data points are acquired, the weight factor increases. This relationship is illustrated by the curve 130 shown in FIG. 12.

After the data points have been properly decimated, and optionally collapsed into slices, the first data set is ready for comparison with the second set of data points. If the points were collapsed into slices, this is the final form of the first set; if not, more outliers may be removed in the course of the calibration process. In any case, at this point the second set of data is generated as the estimate of differential amounts of liquid (dV/dh or Vop–Vcl), taken for the same heights as points in the first set and for some initial estimate of the calibration parameters. The processor 32 then selects the calibration parameters which deliver the best agreement between the first and the second sets of data, i.e., the best fit.

The processor 32 is programmed with a routine which searches for the calibration parameters by fitting the second set of data points to an analytical model, expressing either volume V or its derivative with respect to height dV/dh as a function of height h and the calibration parameters of the tank. The preferred form of these functions is given in Appendix A (V=V(height, calibration parameters)) and Appendix B (dV/dh=dV/dh(height, calibration parameters), respectively.

Those skilled in the art will recognize that the process for selecting the calibration parameters may take many forms and embodiments. One way to proceed, which is especially suitable if the data is collapsed into slices and the processor 32 has limited memory, is to search for one subset of the calibration parameters at a time, the decision as to what parameters to include in the subset at any given time being dependent on the height range available at the moment. The calibration parameters can be ranked in ascending order of height range required to fit a parameter as follows: 1) length, 2) probe offset, 3) end shape, 4) diameter, and 5) tilt. This rank was developed as a result of numerous tank calibrations.

Figure 13:
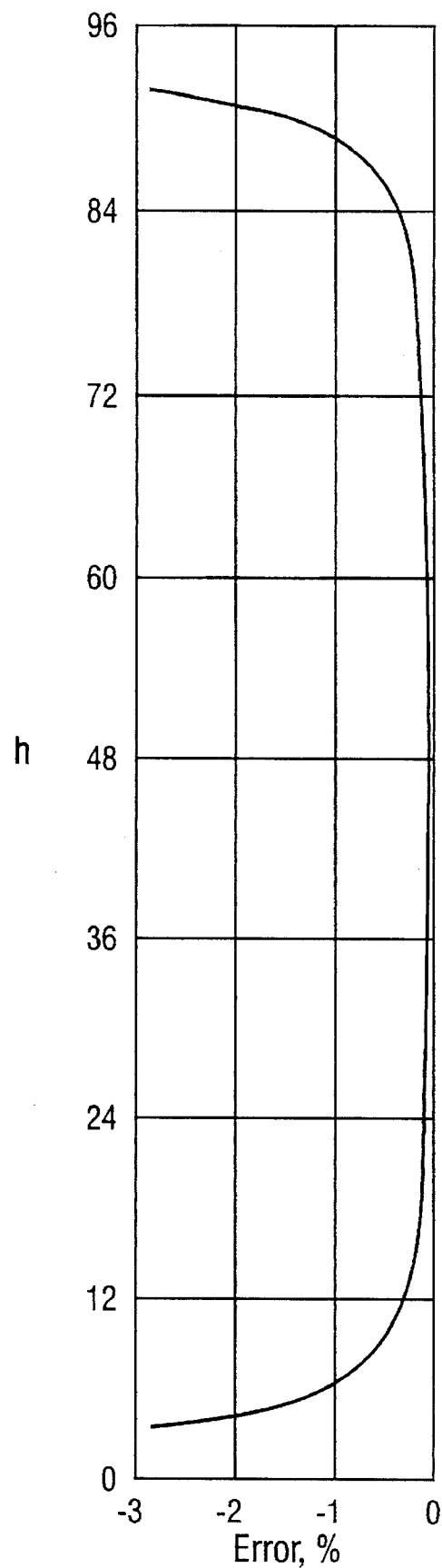
FIGS. 13-18 are graphs of sample relative errors in dV/dh (in percentage of the true value) vs. the liquid height over the whole height range due to the errors in four of the calibration parameters, namely tilt, offset, diameter and end factor.
Figure 14:
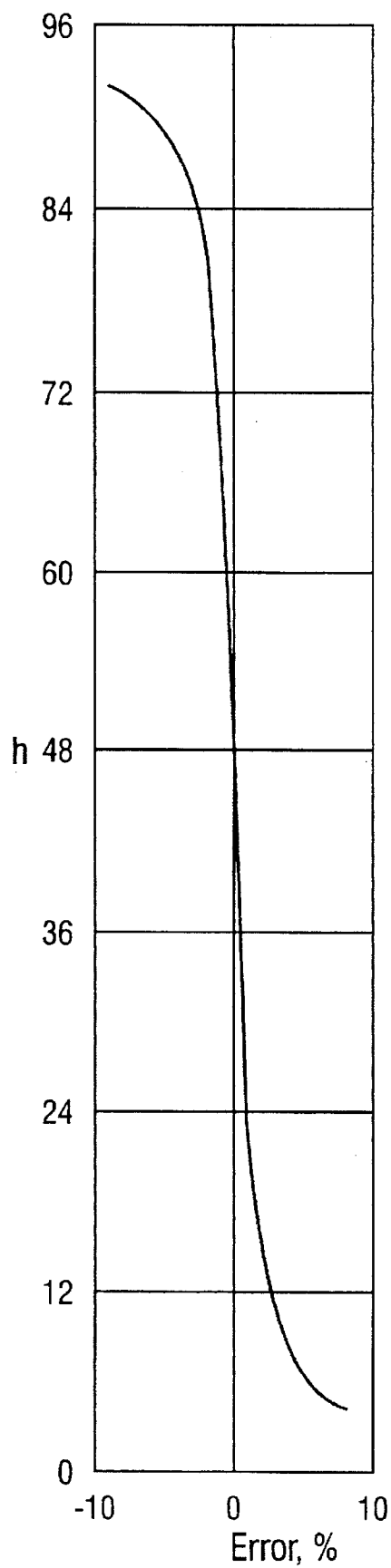
Figure 15:
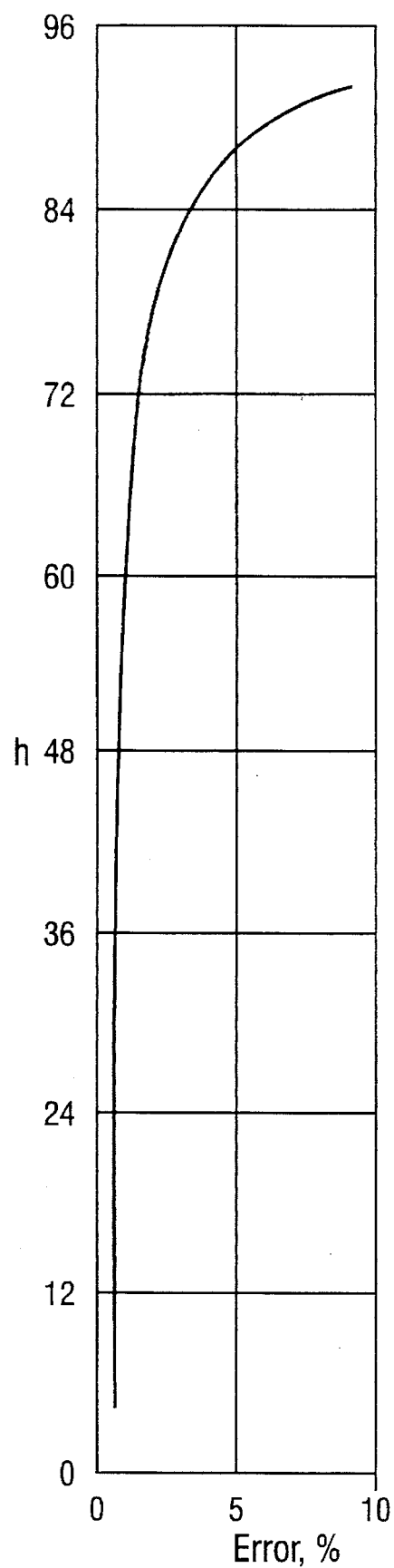
Figure 16:
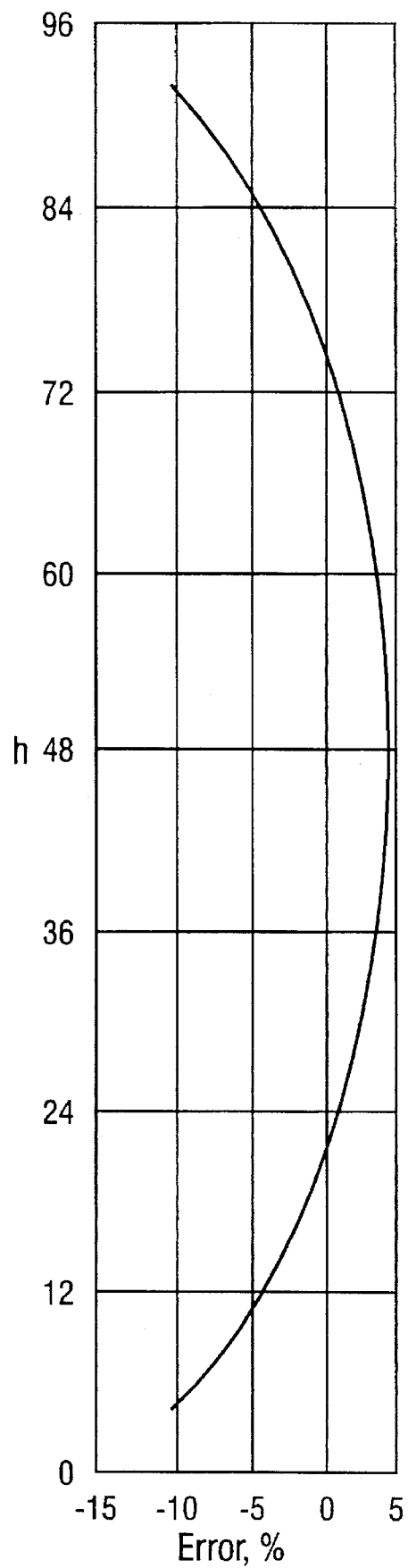
Figure 17:
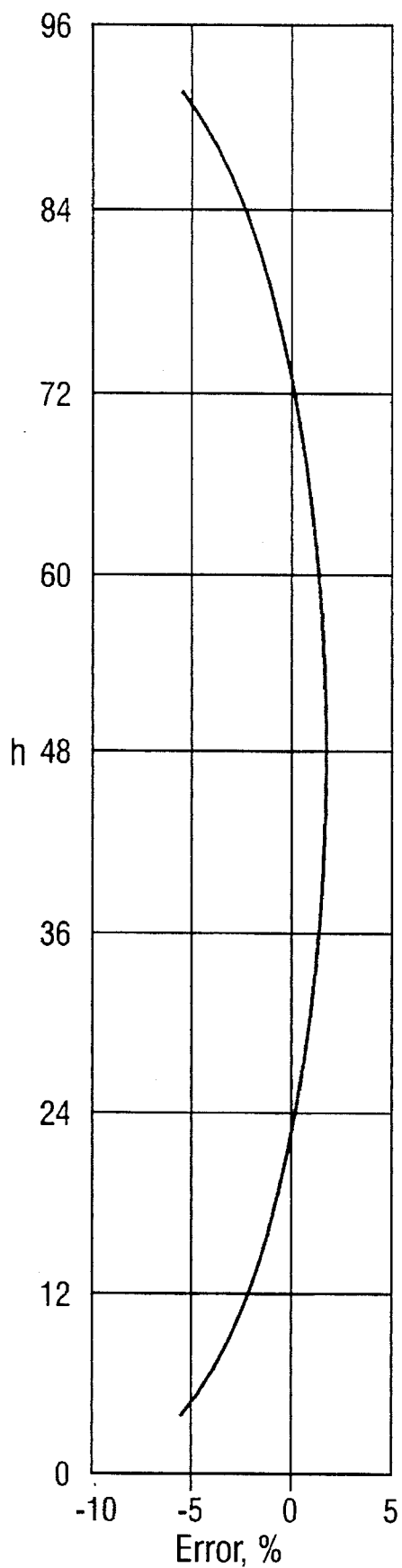
Figure 18:
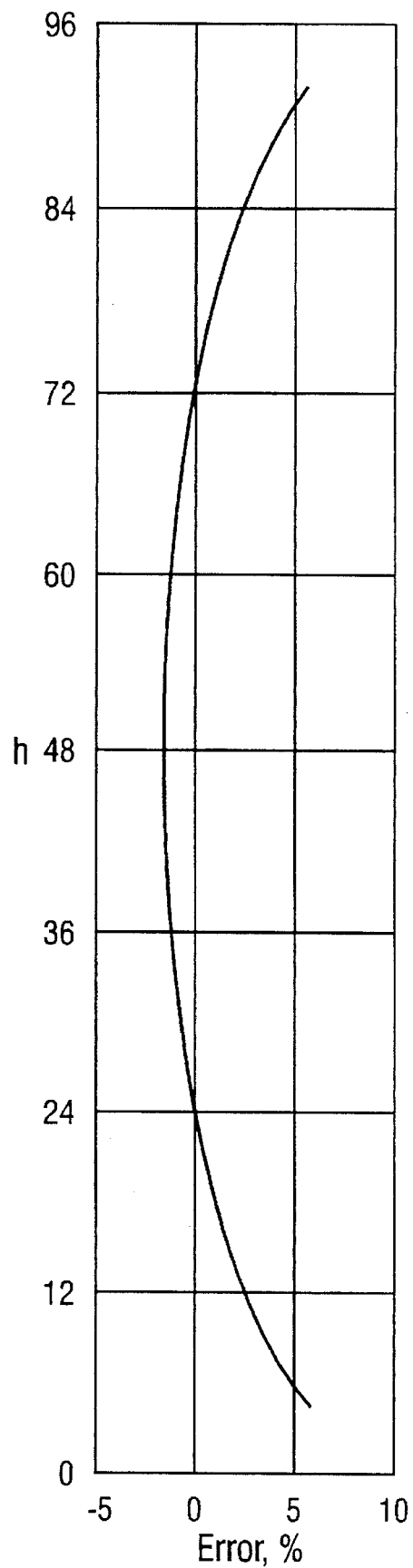

To illustrate this approach, FIGS. 13–18 show sample plots of the relative error in dV/dh (in percentage of the true value) vs. the liquid height over the whole height range due to the errors in four of the parameters. Specifically, FIG. 13 shows the relative error in % of no tilt over a center height range of 4 to 92 inches for a tilt of 6 inches. FIG. 14 shows the relative error in % of no offset over the same center height range for an offset of 0.8 inches. FIG. 15 shows the relative error in % of 96" diameter over the same center height range for a diameter error of +0.8 inches. FIG. 16 shows the relative error in % of no end factor error over the same center height range for an end factor of +1.0. FIG. 17 shows the relative error in % of no end factor error over the same center height range for an end factor of +0.5. FIG. 18 shows the relative error in % of no end factor error over the same center height range for an end factor of −0.5.

Figure 19A:
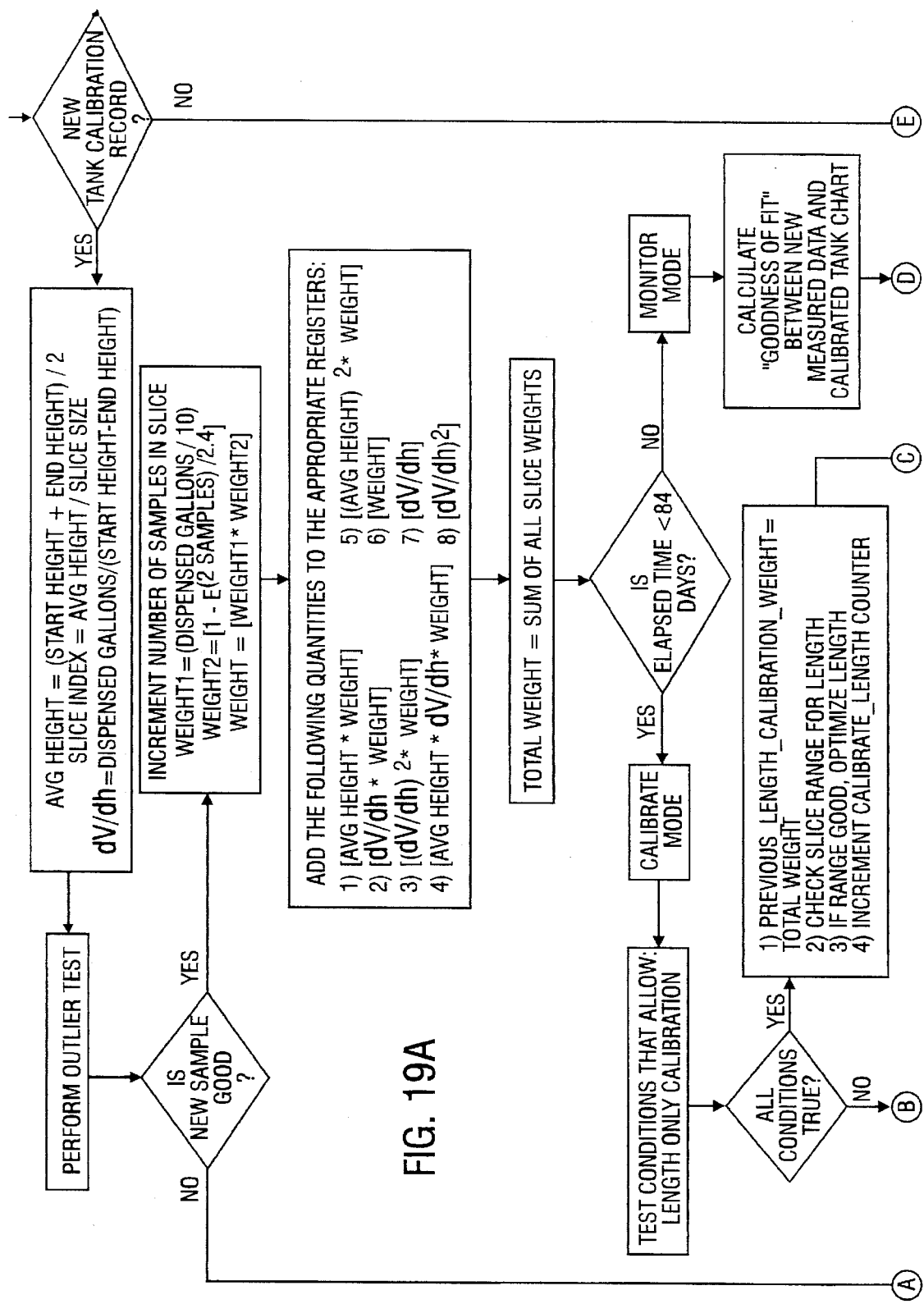
FIG. 19 is a flow diagram of the steps followed by a processor carrying out the calibration method according to the present invention.
Figure 19B:
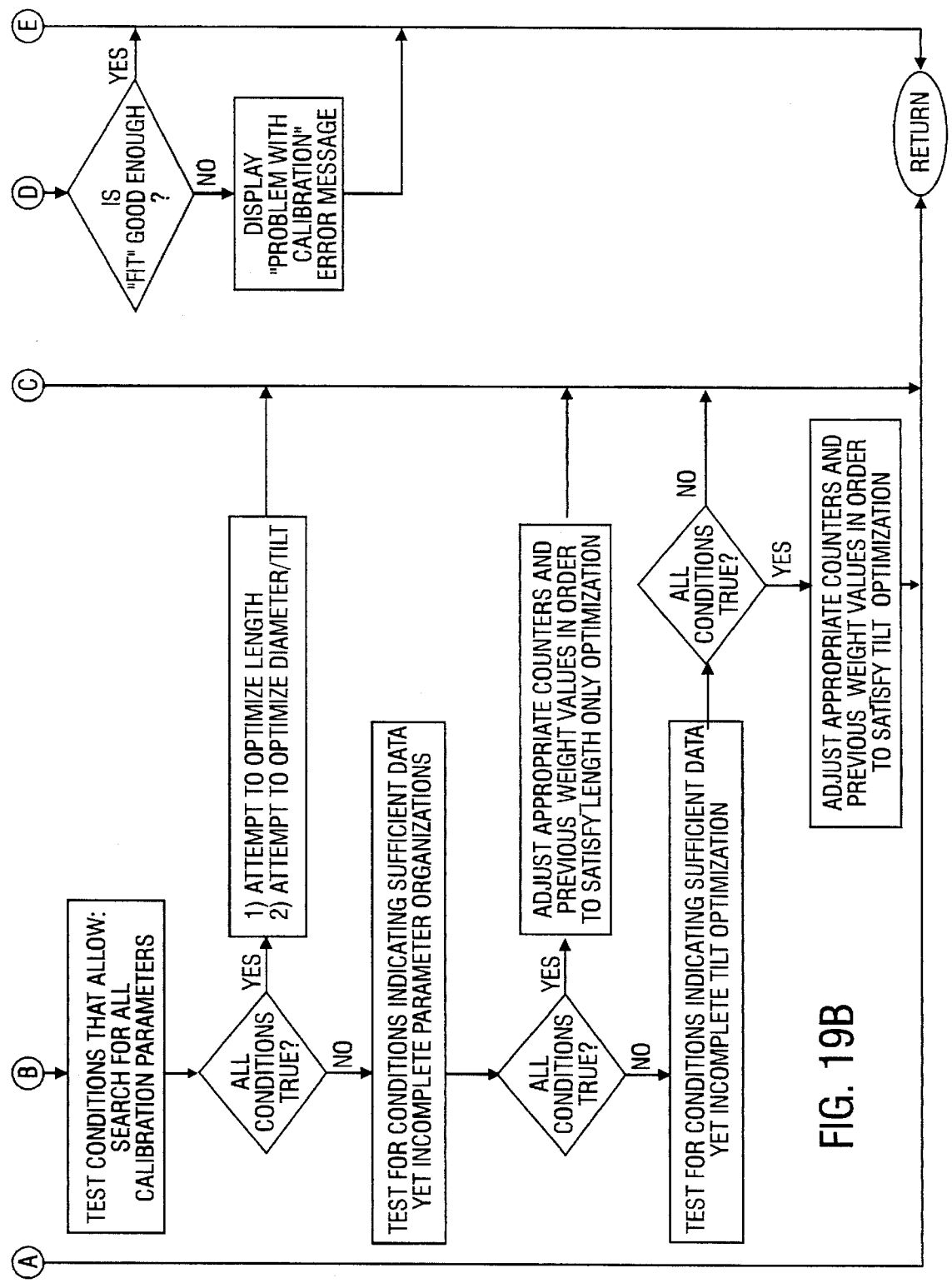
Figure 20A:
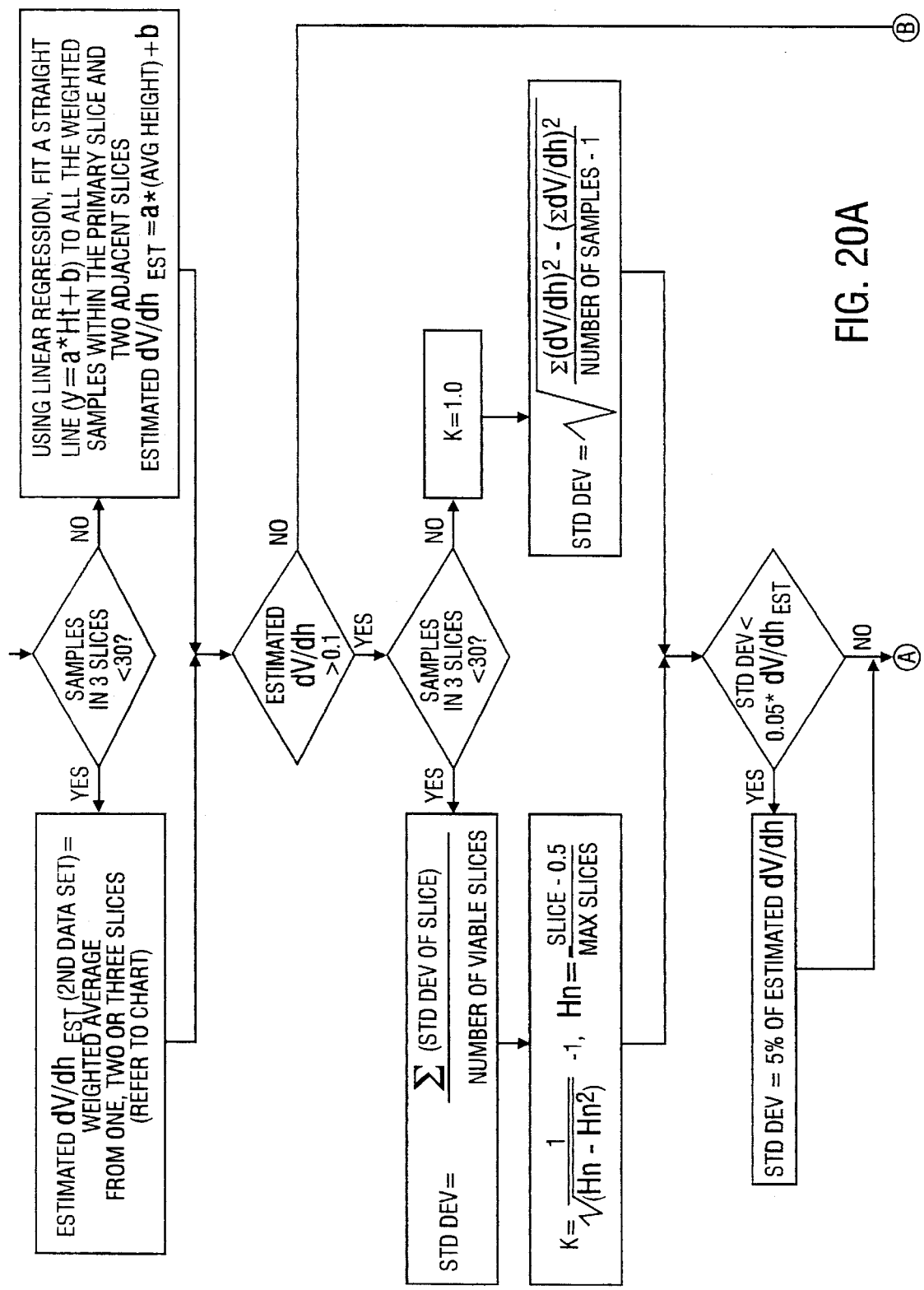
FIG. 20 is a flow diagram of the steps followed by a processor carrying out the removal of outliers according to the present invention.
Figure 20B:
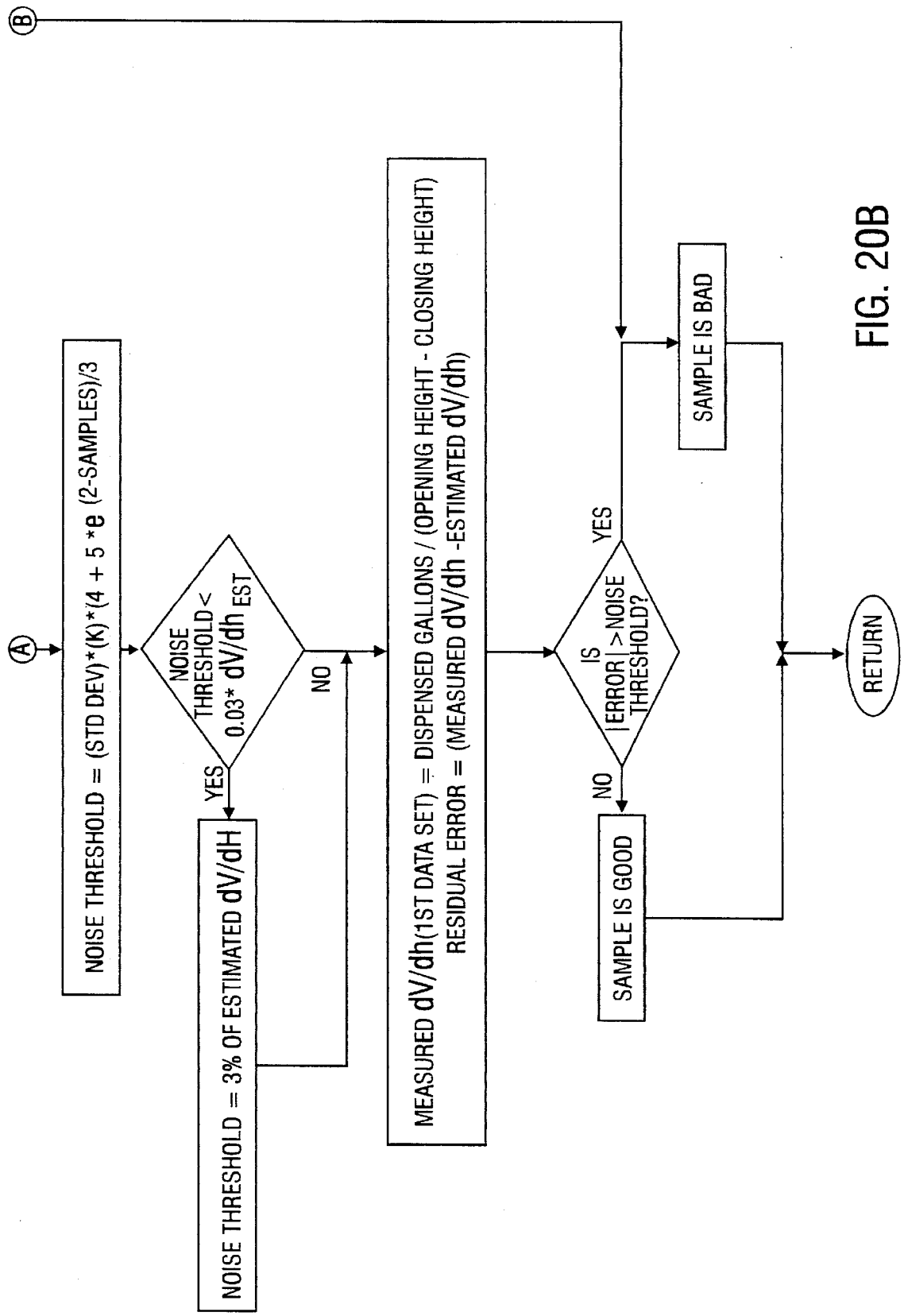

Comparing FIGS. 13 and 14, it can be seen that the polarity and shape of the error in the top portion of the tank is similar for both plots, but different in the bottom. Therefore, it is easier to distinguish between the errors due to tilt and offset, if data in both the top and the bottom portions of the tank are available. In the fitting process, according to the present invention, the selection as to which calibration parameter to fit next is based on the shape of the error plots. A simplified flowchart of the tank calibration process for this approach is shown in FIG. 19, and the flowchart of the outliers removal test is shown in FIG. 20.

In a more general approach, a non-linear curve fitting routine can be utilized to derive the calibration parameters. (Since the functions given in Appendices A and B are non-linear with respect to the calibration parameters, a non-linear curve fitting routine is required). The routine searches for the calibration parameters which yield the minimum sum of the squares of residuals (SSR) between the first and the second sets of data, that is, between the measured dV or dV/dh and the estimated dV or dV/dh values, with the constraints imposed on these parameters (e.g., the end shape can only vary between 0 and 1). As will be appreciated by those of ordinary skill in the art, other figure-of-merit functions may be employed, e.g., the sum of the absolute values. Furthermore, persons of ordinary skill in the art will appreciate that the routine may take many forms and embodiments. Commercially available examples of a constrained minimization routine which can be applied to the problem of non-linear curve fitting include: Optimization Toolbox, available from The Math Works, Inc., 24 Prime Park Way, Natick, Mass., 01760, U.S.A.; and NAG C Library, available from Numerical Algorithms Group, 1400 Opus Place, Suite 200, Downers Grove, Ill. 60515, U.S.A.

If the measured data are not collapsed into slices, they are likely to include outliers (the experimental points that are substantially way off), in spite of the precautions taken. In this situation, methods of robust estimation need to be applied along with the non-linear curve fitting routine to eliminate these outliers. Again, these methods may take many forms. For example, the removal of outliers can proceed as follows: On each iteration, a curve is fitted to the data points, using the constrained minimization routine, and standard deviation of residuals is calculated. Then, the confidence intervals around the fitted curve of width width=α*(standard deviation of residuals)

are drawn, α being an input "width parameter," e.g., α=3. All experimental points beyond these intervals are qualified as outliers and removed. Then, the curve is fitted to the remaining points. The iterations converge when certain consistency is reached (e.g., no more than 1% of points removed on n-th iteration. In this case, consistency is 0.99).

Those skilled in the art who now have the benefit of the present disclosure will appreciate that the present invention may take many forms and embodiments. Some embodiments have been described so as to give an understanding of the invention. It is intended that these embodiments should be illustrative, and not limiting of the present invention. Rather, it is intended that the invention cover all modifications, equivalents and alternatives falling within the spirit and scope of the invention as defined by the appended claims.

APPENDIX A

Volume of Fuel In a Liquid Storage Tank as a Function of Fuel Height

Figure 21:
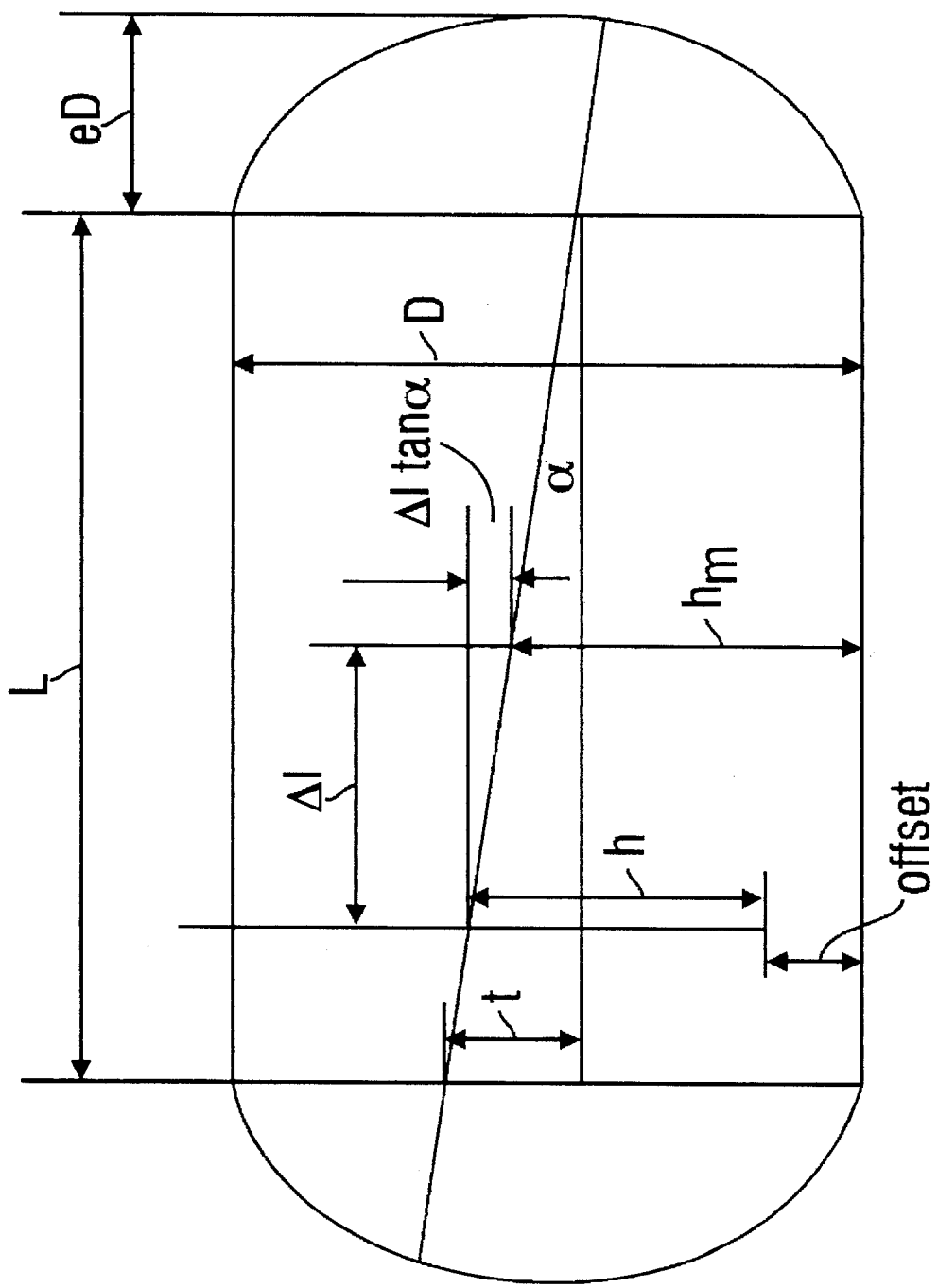
FIG. 21 is a diagram of the dimensions of a liquid storage tank used in the present invention.

A diagram of the dimensions of a liquid storage tank used in the present invention is shown in FIG. 21.

1. Volume of Fuel In a Tank with Zero Tilt

In this case $\alpha=0$ and the volume of the parts of the tank are as follows:

$$V_{middle}(h) = LR^2(acos(-x) + x\sqrt{1-x^2}),$$

$$x = \frac{(h_m - R)}{R},$$

$$V_{left}(h) + V_{right}(h) = \frac{\pi e}{3}(3R - h_m)h_m^2,$$

where $R=D/2$ is the radius of the tank, $h_m=h+0$ is the fuel height in the middle of the tank.

2. Volume of Fuel In a Tank With a Non-Zero Tilt

In this case, for $V_{middle}$ an exact formula is used, and for $V_{left\ and\ Vright}$ an approximation for a segment of an ellipsoid, with the height taken as the average of the height at the end of the cylindrical part and the height of the fuel surface with the ellipsoidal surface of the tank (respectively, $(h_L+h_+)/2$ or $(h_R+h_-)/2$). A case is called regular if the tilted fuel surface does not intersect the tank surface within its cylindrical part. If the case is not regular, the formulae are slightly modified. The procedure is based on the following formulae. First, $h_R$ and $h_L$ are determined (see FIG. 22):

$$h_L = h_m + \frac{L\tan\alpha}{2},\ h_R = h_m - \frac{L\tan\alpha}{2}.$$

Taking an offset into account, the meaningful values of $h_m$ are bounded by $$-\frac{L\tan\alpha}{2} \leq h_m \leq D + \frac{L\tan\alpha}{2}.$$

If $h_m$ is less or larger than these limits, the returned volume is, respectively, zero or full capacity, and the derivative dV/dh is zero is both cases.

Figure 22:
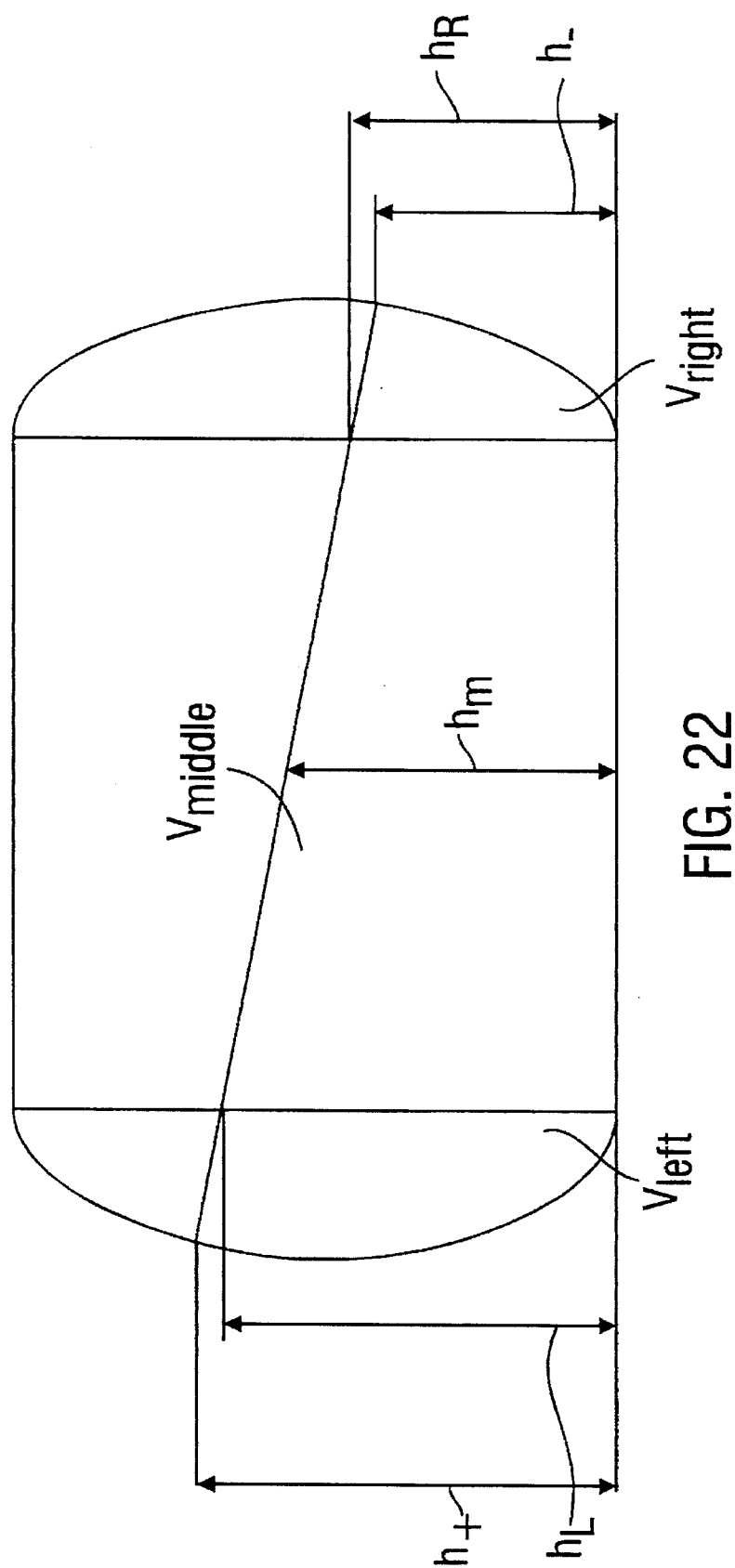
FIGS. 22-24 are diagrams of various liquid levels which may be present in a liquid storage tank having a non-zero tilt.

If $h_L$ is not greater than D (diameter of the cylindrical part) and $h_R$ not less than zero, the case is regular (FIG. 22). For a regular case and a non-zero tilt, $$\frac{V_{middle}}{LR^2} \equiv I(x_1, x_2) = \frac{1}{x_2 - x_1} \int_{x_1}^{x_2} (acos(-x) + x\sqrt{1-x^2})dx =$$

$$\frac{1}{x_2 - x_1} \{x_2 acos(-x_2) - x_1 acos(-x_1) +$$

$$\sqrt{1-x_2^2} - \sqrt{1-x_1^2} + \frac{1}{3}[(1-x_1^2)^{3/2} - (1-x_2^2)^{3/2}]\}$$

where $x_1=(h_L-R)/R$, $x_2=(h_R-R)/R$, $R=D/2$ is the radius.

$V_{left}$ and $V_{right}$ for the regular case are approximated, respectively, as $$V_{left}(h_{LO}) = \frac{\pi e}{6}(3R - h_{LO})h_{LO}^2,$$

$$V_{right}(h_{RO}) = \frac{\pi e}{6}(3R - h_{RO})h_{RO}^2,$$

where $h_{LO}=(h_L+h_+)/2$, $h_{RO}=(h_R+h_-)/2$, (see FIG. 22), $$h_+ = h_L + x_L * \sin\alpha,\ h_- = h_R - x_R * \sin\alpha,$$

$$x_L = (R - h_L) * \sin\alpha + \sqrt{(h_L - R)^2 * \sin^2\alpha + 2 * R * h_L + h_L^2},$$

Figure 23:
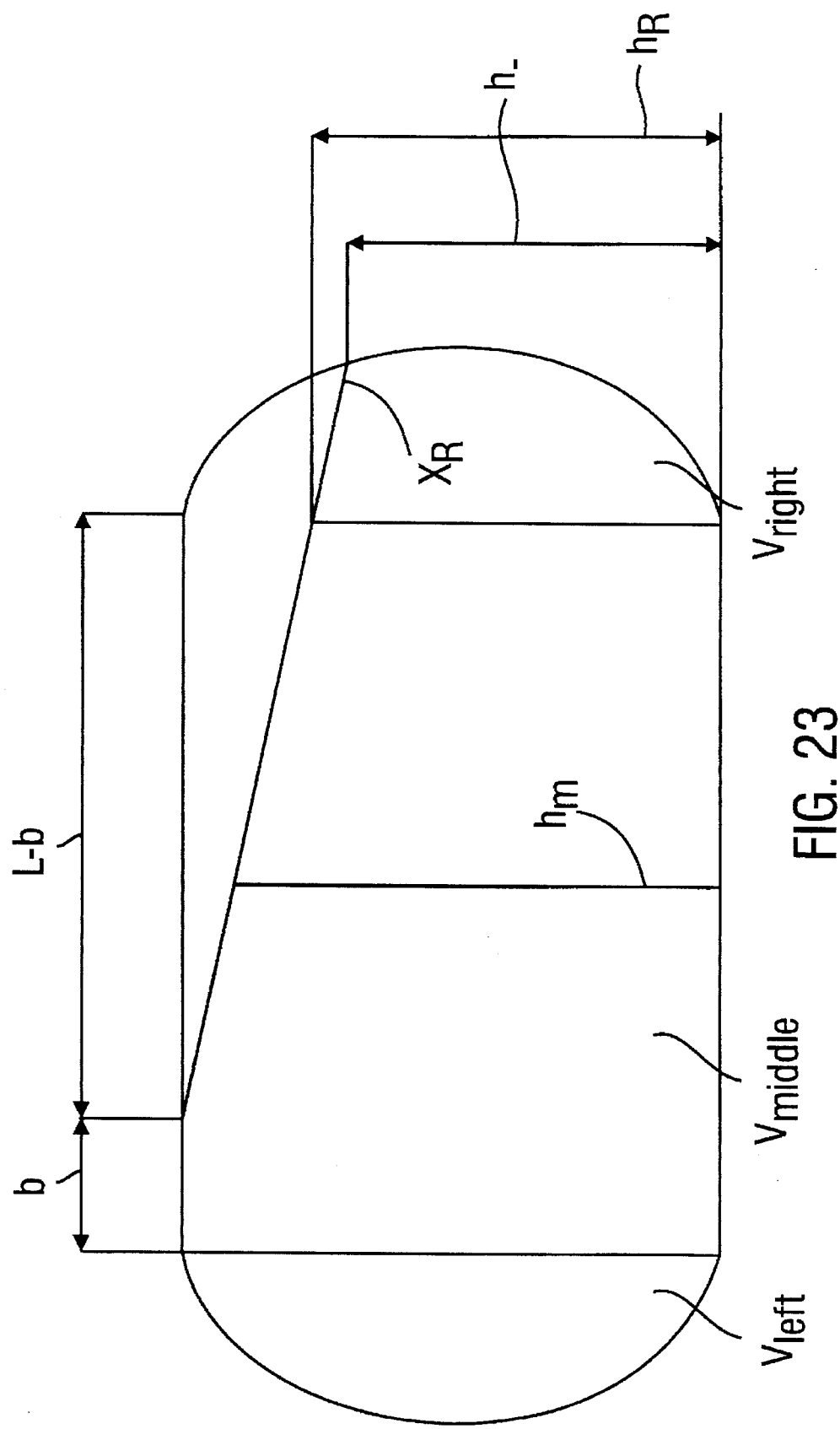
Figure 24:
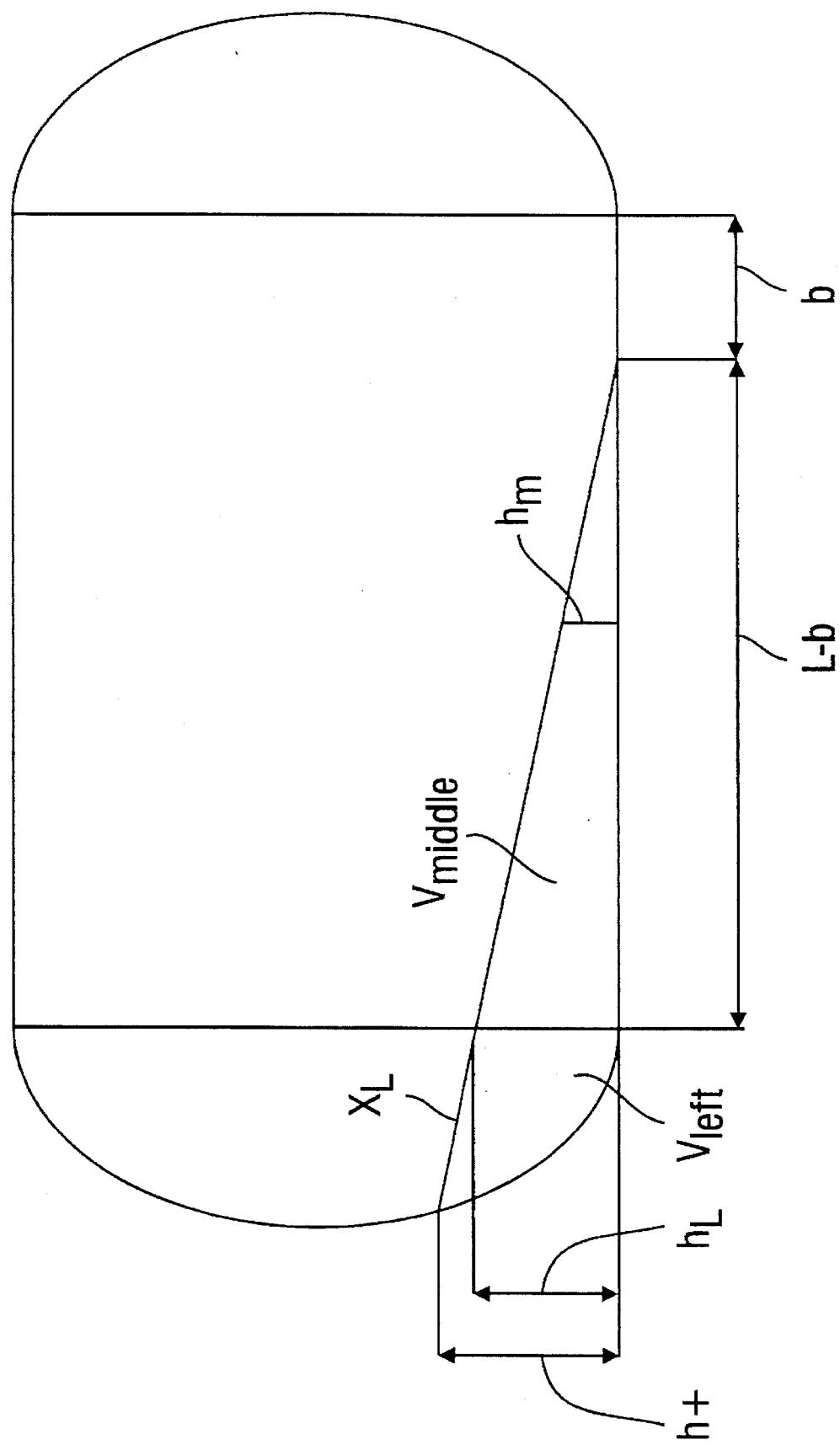

If a case is irregular (FIGS. 23 and 24), the following formulae apply. If $h_L > D$ (see FIG. 23), then $$x_R = (h_R - R) * \sin\alpha + \sqrt{(h_R - R)^2 * \sin^2\alpha + 2 * R * h_R + h_R^2}$$

$$V_{left} = V_{left}(D), V_{right} = V_{right}(h_{RO}),$$
$$V_{middle} = \pi R^2 b + R^2(L - b) \cdot l(1,x_2),$$
$$b = \frac{L}{2} - (D - h_m)\cot\alpha$$

If $h_R < 0$ (see FIG. 24), then $$V_{left} = V_{left}(h_{LO}), V_{right} = 0,$$
$$V_{middle} = R^2(L - b) \cdot l(x_1,0),$$

$$b = \frac{L}{2} - h_m \cot\alpha$$

APPENDIX B

Derivatives of Volume of Fuel In a Liquid Storage Tank

With Respect to Fuel Height

1. Derivatives for a Tank with Zero Tilt

The derivatives are $$\frac{\partial V_{middle}}{\partial h} = 2RL\sqrt{1 - x^2},$$

$$\frac{\partial V_{left}}{\partial h} + \frac{\partial V_{right}}{\partial h} = \pi e(Dh_m - h_m^2),$$

where $$x = \frac{(h_m - R)}{R},$$

and $R = D/2$ is the radius and $h_m = h + 0$ is the fuel height in the middle of the tank.

2. Derivatives for a Tank with Non-Zero Tilt

The derivatives $\partial V/\partial h$ for the regular case (see FIG. 22) are expressed as follows.

$$\frac{\partial V_{middle}}{\partial h} =$$

$$\frac{RL}{x_2 - x_1} (a\cos(-x_2) - a\cos(-x_1) + x_2\sqrt{1 - x_2^2} - x_1\sqrt{1 - x_1^2}),$$

where $x_1 = (h_L - R)/R$, $x_2 = (h_R - R)/R$. Derivatives $\partial V_{left}/\partial h$, $\partial V_{right}/\partial h$ are approximated as $$\frac{\partial V_{left}}{\partial h} = \pi e \left( Rh_{LO} - \frac{h_{LO}^2}{2} \right), \frac{\partial V_{right}}{\partial h} = \pi e \left( Rh_{RO} - \frac{h_{RO}^2}{2} \right).$$

If a case is irregular (see FIGS. 23, 24), the following formulae apply. If $h_L > D$ (see FIG. 23), $$\frac{\partial V_{middle}}{\partial h} = R^2 \left\{ \cot\alpha[\pi - l(1,x_2)] + \right.$$

$$\left. \frac{(L-b)}{R(x_2 - 1)} [-l(1,x_2) + a\cos(-x_2) + x_2\sqrt{1 - x_2^2}] \right\},$$

$\partial V_{left}/\partial h = 0$, $\partial V_{right}/\partial h$ is given by its regular expression, where $l(x_1,x_2)$ is defined in Appendix A, Section 2. If $h_R < 0$ (see FIG. 24), then $$\frac{\partial V_{middle}}{\partial h} = R^2 \left\{ \cot\alpha l(x_1,-1) + \right.$$

$$\left. \frac{(L-b)}{R(x_1 + 1)} [-l(x_1,-1) + a\cos(-x_1) + x_1\sqrt{1 - x_1^2}] \right\},$$

$\partial V_{right}/\partial h = 0$, $\partial V_{left}/\partial h$ is given by its regular expression.

What is claimed is:

1. An apparatus for calibrating a liquid storage tank, comprising:

(a) a sensor for sensing the level of the liquid in the tank, said sensor providing first output signals proportional to the sensed liquid levels;

(b) at least one metering device for measuring the amount of liquid being dispensed into or out of the storage tank, said at least one metering device providing second output signals proportional to the amount of liquid being dispensed and third output signals communicating information on the beginning and end of each dispensing period; and (c) a processor having multiple inputs for receiving said first, second and third output signals, said processor being operative:

(i) to store a first set of data values which represent differential amounts of liquid dispensed into or out of the storage tank as measured by the at least one metering device per unit of associated differential height change as measured by the sensor;

(ii) to generate a second set of data values which represent estimates of the differential amounts of liquid dispensed into or out of the storage tank per unit of associated differential height change, said processor being programmed with an algorithm which employs a mathematical formula for computing said second set of data values which expresses the differential amounts of liquid dispensed into or out of the tank per unit of associated differential height change as a function of the liquid level measurements and a number of calibration parameters including the dimensions of the tank and at least one of the orientation of the tank relative to gravity field and the position of the sensor inside the tank; and (iii) to calibrate the tank by searching for the calibration parameters which yield the minimum error between the first and second sets of data, said error being generated by a merit function the output of which produces error values, said values being such that the smaller the value the closer the agreement between the first and second sets of data and the minimum error being defined as the smallest of these values.

2. The apparatus for calibrating a liquid storage tank according to claim 1, wherein the processor is further operative to derive the first set of data values from liquid level and dispensed volume readings taken during multiple dispensing periods.

3. The apparatus for calibrating a liquid storage tank according to claim 2, wherein the processor is further operative to fit a smooth curve through the liquid level measurements taken during a given idle period and to select the opening and closing heights from said curve which are used to calculate the height change values used in deriving the first set of data points.

4. The apparatus for calibrating a liquid storage tank according to claim 2, wherein the processor is further operative to merge the multiple dispensing periods into a more limited number of combined dispensing periods.

5. The apparatus for calibrating a liquid storage tank according to claim 4, wherein the processor is further operative to collapse the data points from the first set of data values into a limited number of segments taken along the tank height.

6. The apparatus for calibrating a liquid storage tank according to claim 5, wherein the processor is further operative to assign different weight values to each of the data points in the first set of data values and to discard any points which are outside a boundary which is dependent on the height range represented in the first set of data.

7. The apparatus for calibrating a liquid storage tank according to claim 1, wherein the processor is further operative to refine a subset of the calibration parameters at a time, the decision as to what parameters to include at any given time being dependent on the height range represented in the first set of data.

8. The apparatus for calibrating a liquid storage tank according to claim 1, wherein the merit function employs a sum of the squares of the residual errors between the first and second set of data.

9. A method for calibrating a liquid storage tank having a sensor for sensing the level of the liquid in the tank, at least one metering device for measuring the amount of liquid being dispensed into or out of the storage tank, and a processor connected to the sensor and the at least one metering device for receiving data from said sensor and at least one metering device, the method comprising the steps of:

(a) storing a first set of data values which represent differential amounts of liquid dispensed into or out of the storage tank as measured by the at least one metering device per unit of associated differential height change as measured by the sensor;

(b) generating a second set of data values which represent estimates of the differential amounts of liquid dispensed into or out of the storage tank per unit of associated differential height change, said second set of data values being computed using an algorithm employing a mathematical formula which expresses the differential amounts of liquid dispensed into or out of the storage tank per unit of associated differential height change as a function of the liquid level measurements and a number of calibration parameters including the dimensions of the tank and at least one of the orientation of the tank relative to gravity field and the position of the sensor inside the tank; and (c) searching for the calibration parameters which yield the minimum error between the first and second sets of data, said error being generated by a merit function the output of which produces error values, said values being such that the smaller the value the closer the agreement between the first and second sets of data and the minimum error being defined as the smallest of these values.

10. The method for calibrating a liquid storage tank according to claim 9, further comprising the step of deriving the first set of data values from liquid level and dispensed volume readings taken during multiple dispensing periods.

11. The method for calibrating a liquid storage tank according to claim 10, further comprising the steps of fitting a smooth curve through the liquid level measurements taken during a given idle period and selecting the opening and closing heights from said curve which are used to calculate the height change values used in deriving the first set of data points.

12. The method for calibrating a liquid storage tank according to claim 10, further comprising the step of merging the multiple dispensing periods into a more limited number of combined dispensing periods.

13. The method for calibrating a liquid storage tank according to claim 12, further comprising the step of collapsing the data points from the first set of data values into a limited number of segments taken along the tank height.

14. The method for calibrating a liquid storage tank according to claim 13, further comprising the steps of assigning different weight values to each of the data points in the first set of data values and discarding any points which are outside a boundary which is dependent on the height range represented in the first set of data.

15. The method for calibrating a liquid storage tank according to claim 9, further comprising the step of refining a subset of the calibration parameters at a time, the decision as to what parameters to include in the subset at any given time being dependent on the height range represented in the first set of data.

16. An apparatus for calibrating a liquid storage tank, comprising:

(a) a sensor for sensing the level of the liquid in the tank, said sensor providing first output signals proportional to the sensed liquid levels;

(b) at least one metering device for measuring the amount of liquid being dispensed into or out of the storage tank, said at least one metering device providing second output signals proportional to the amount of liquid being dispensed and third output signals communicating information on the beginning and end of each dispensing period; and (c) a processor having multiple inputs for receiving said first, second and third output signals, said processor being operative:

(i) to store a first set of data values which represent differential amounts of liquid dispensed into or out of the storage as measured by the at least one metering device, said measurements being taken at various liquid levels in the tank which are measured by the sensor;

(ii) to generate a second set of data values which represent estimates of the differential amounts of liquid dispensed into or out of the storage tank, said processor being programmed with an algorithm which employs a mathematical formula in computing said second set of data values which expresses the volume of the liquid in the (ink as a function of the liquid level measurements and a number of calibration parameters including the dimensions of the tank and at least one of the orientation of the tank relative to gravity field and the position of the sensor inside the tank; and (iii) to calibrate the tank by searching for the calibration parameters which yield the minimum error between the first and second sets of data, said error being generated by a merit function the output of which produces error values, said values being such that the smaller the value the closer the agreement between the first and second sets of data and the minimum error being defined as the smallest of these values.

17. The apparatus for calibrating a liquid storage tank according to claim 16, wherein the processor is further operative to derive the first set of data values from dispensed volume readings taken during multiple dispensing periods.

18. The apparatus for calibrating a liquid storage tank according to claim 17, wherein the processor is further operative to merge the multiple dispensing periods into a more limited number of combined dispensing periods.

19. The apparatus for calibrating a liquid storage tank according to claim 18, wherein the processor is further operative to collapse the data points from the first set of data values into a limited number of segments taken along the tank height.

20. The apparatus for calibrating a liquid storage tank according to claim 19, wherein the processor is further operative to assign different weight values to each of the data points in the first set of data values and to discard any points which are outside a boundary which is dependent on the height range represented in the first set of data.

21. The apparatus for calibrating a liquid storage tank according to claim 16, wherein the processor is further operative to refine a subset of the calibration parameters at a time, the decision as to what parameters to include in the subset at any given time being dependent on the height range represented in the first set of data.

22. The apparatus for calibrating a liquid storage tank according to claim 16, wherein the merit function employs a sum of the squares of the residual errors between the first and second set of data.

23. An apparatus for calibrating a liquid storage tank, comprising:
  (a) a sensor for sensing the level of the liquid in the tank, said sensor providing first output signals proportional to the sensed liquid levels;
  (b) at least one metering device for measuring the amount of liquid being dispensed into or out of the storage tank, said at least one metering device providing second output signals proportional to the amount of liquid being dispensed and third output signals communicating information on the beginning and end of each dispensing period; and
  (c) a processor having multiple inputs for receiving said first, second and third output signals, said processor being operative:
    (i) to generate a first set of raw data values which represent differential amounts of liquid dispensed into or out of the storage tank as measured by the at least one metering device per unit of associated differential height change as measured by the sensor;
    (ii) to generate a second set of data values from the first set of raw data values by collapsing the data points from the first set of raw data into a limited amount of segments taken along the tank height;
    (iii) to store the second set of data values;
    (iv) to generate a third set of data values which represent estimates of the differential amounts of liquid dispensed into or out of the storage tank per unit of associated differential height change, said processor being programmed with an algorithm which employs a mathematical formula for computing said third set of data values which expresses the differential amounts of liquid dispensed into or out of the storage tank per unit of associated differential height change as a function of the liquid level measurements and a number of calibration parameters; and
    (v) to calibrate the rank by searching for the calibration parameters which yield the minimum error between the second and third sets of data, said error being generated by a merit function the output of which produces error values, said values being such that the smaller the value the closer the agreement between the second and third sets of data and the minimum error being defined as the smallest of these values.

24. The apparatus for calibrating a liquid storage tank according to claim 23, wherein the number of calibration parameters include the dimensions of the tank and at least one of the orientation of the tank relative to gravity field and the position of the sensor inside the tank.

25. The apparatus for calibrating a liquid storage tank according to claim 24, wherein the processor is further operative to refine a subset of the calibration parameters at a time, the decision as to what parameters to include in the subset at any given time being dependent on the height range represented in the first set of data.

26. The apparatus for calibrating a liquid storage tank according to claim 23, wherein the merit function employs a sum of the squares of the residual errors between the first and second set of data.

27. The apparatus for calibrating a liquid storage tank according to claim 23, wherein the processor is further operative to assign different weight values to each of the data points in the first set of raw data values and to discard any points which are outside a boundary which is dependent on the height range represented in the first set of data.

28. The apparatus for calibrating a liquid storage tank according to claim 23, wherein the processor is further operative to merge the multiple dispensing periods into a more limited number of combined dispensing periods.

29. An apparatus for calibrating a liquid storage tank, comprising:
  (a) a sensor for sensing the level of the liquid in the tank, said sensor providing first output signals proportional to the sensed liquid levels;
  (b) at least one metering device for measuring the amount of liquid being dispensed into or out of the storage tank, said at least one metering device providing second output signals proportional to the amount of liquid being dispensed and third output signals communicating information on the beginning and end of each dispensing period; and
  (c) a processor having multiple inputs for receiving said first, second and third output signals, said processor being operative:
    (i) to generate a first set of raw data values which represent differential amounts of liquid dispensed into or out of the storage tank as measured by the at least one metering device during a plurality of dispensing periods, said measurements being taken at various liquid levels in the tank which are measured by the sensor;
    (ii) to generate a second set of data values from the first set of raw data values by collapsing the data points from the first set of raw data into a limited amount of segments taken along the tank height;
    (iii) to store the second set of data values;
    (iv) to generate a third set of data values which represent estimates of the differential amounts of liquid dispensed into or out of the storage tank, said processor being programmed with an algorithm which employs a mathematical formula in computing said third, set of data values which expresses the volume of the liquid in the tank as a function of the liquid level measurements and a number of calibration parameters; and
    (v) to calibrate the tank by searching for the calibration parameters which yield the minimum error between the second and third sets of data, said error being generated by a merit function the output of which produces error values, said values being such that the smaller the value the closer the agreement between the second and third sets of data and the minimum error being defined as the smallest of these values.

30. The apparatus for calibrating a liquid storage tank according to claim 29, wherein the number of calibration parameters include the dimensions of the tank and at least one of the orientation of the tank relative to gravity field and the position of the sensor inside the tank.

31. The apparatus for calibrating a liquid storage tank according to claim 29, wherein the merit function employs a sum of the squares of the residual errors between the first and second set of data.

* * * * *

UNITED STATES PATENT AND TRADEMARK OFFICE
CERTIFICATE OF CORRECTION

PATENT NO. : 5,665,895
DATED : September 9, 1997
INVENTOR(S) : Robert P. Hart, et al.

It is certified that error appears in the above-identified patent and that said Letters Patent is hereby corrected as shown below:

Claim 16(c)(ii), col. 14, line 46, delete "(ink" and insert --tank-- therefor.

Claim 29(c)(iv), col. 16, line 61, after the word "third" delete ",".

Signed and Sealed this

Fifth Day of January, 1999

Attest:

Attesting Officer

Acting Commissioner of Patents and Trademarks